United States Patent
Qin et al.

(10) Patent No.: US 11,514,543 B2
(45) Date of Patent: Nov. 29, 2022

(54) SYSTEM AND METHOD FOR RIDE ORDER DISPATCHING

(71) Applicant: BEIJING DIDI INFINITY TECHNOLOGY AND DEVELOPMENT CO., LTD., Beijing (CN)

(72) Inventors: Zhiwei Qin, Mountain View, CA (US); Xiaocheng Tang, Mountain View, CA (US); Zhaodong Wang, Mountain View, CA (US); Jieping Ye, Tianjin (CN)

(73) Assignee: Beijing DiDi Infinity Technology and Development Co., Ltd., Beijing (CN)

( * ) Notice: Subject to any disclaimer, the term of this patent is extended or adjusted under 35 U.S.C. 154(b) by 891 days.

(21) Appl. No.: 16/314,458

(22) PCT Filed: Jun. 5, 2018

(86) PCT No.: PCT/CN2018/089931
§ 371 (c)(1),
(2) Date: Dec. 31, 2018

(87) PCT Pub. No.: WO2019/232693
PCT Pub. Date: Dec. 12, 2019

(65) Prior Publication Data
US 2021/0233196 A1    Jul. 29, 2021

(51) Int. Cl.
*G06Q 50/30* (2012.01)
*G06N 3/04* (2006.01)
(Continued)

(52) U.S. Cl.
CPC .......... *G06Q 50/30* (2013.01); *G06N 3/0454* (2013.01); *G06N 3/08* (2013.01); *G06Q 10/06316* (2013.01)

(58) Field of Classification Search
CPC ...... G06Q 50/30; G06Q 10/02; G06Q 10/047; G06Q 10/04; G06N 3/0454; G06N 3/08; G06N 3/02
See application file for complete search history.

(56) References Cited

U.S. PATENT DOCUMENTS

2010/0332242 A1* 12/2010 Kamar ............... G06Q 10/02
                                                                 705/1.1
2013/0024249 A1   1/2013 Zohar et al.
(Continued)

FOREIGN PATENT DOCUMENTS

| CN | 107480807 A | 12/2017 |
| CN | 107844843 A | 3/2018 |
| WO | 2013/072729 A1 | 5/2013 |

OTHER PUBLICATIONS

Zhang, Y., Miner, Z., & Jiang, Y. (2017). A data-driven quantitative assessment model for taxi industry: The scope of business ecosystem's health. European Transport Research Review, 9(2), 1-14. doi:http://dx.doi.org/10.1007/s12544-017-0241-0 (Year: 2017).*
(Continued)

*Primary Examiner* — Michael P Harrington
(74) *Attorney, Agent, or Firm* — Sheppard Mullin Richter & Hampton LLP

(57) ABSTRACT

Systems and methods are provided for ride order dispatching. Such method may comprise obtaining information on a location of a vehicle and a time to input into a trained neural network algorithm; and based on a policy generated from the trained neural network algorithm, obtaining action information for the vehicle, the action information comprising: staying at a current position of the vehicle, re-positioning the vehicle, or accepting a ride order.

20 Claims, 18 Drawing Sheets

(51) Int. Cl.
 G06N 3/08 (2006.01)
 G06Q 10/06 (2012.01)

(56) References Cited

U.S. PATENT DOCUMENTS

| | | | | |
|---|---|---|---|---|
| 2014/0088865 | A1* | 3/2014 | Thies | G01C 21/34 |
| | | | | 701/465 |
| 2016/0253617 | A1* | 9/2016 | Truong | H04B 1/3822 |
| | | | | 705/7.15 |
| 2017/0286860 | A1* | 10/2017 | Chen | G06N 3/08 |
| 2018/0197071 | A1* | 7/2018 | Dong | G06N 3/0454 |
| 2018/0266844 | A1* | 9/2018 | Heo | G01C 21/3461 |
| 2021/0049472 | A1* | 2/2021 | Ishiguro | G06Q 10/04 |

OTHER PUBLICATIONS

PCT International Search Report and the Written Opinion dated Feb. 27, 2019, issued in related International Application No. PCT/CN2018/089931 (6 pages).
L. Moreira-Matias et al., "On Predicting the Taxi-Passenger Demand: A Real-Time Approach" Portuguese Conference on Artificial Intelligence. Springer, 2013, pp. 54-65.
L. Moreira-Matias et al., "Predicting Taxi-Passenger Demand Using Streaming Data", IEEE Transactions on Intelligent Transportation Systems, vol. 14, No. 3, 2013, pp. 1393-1402.
Qingquan Li et al., "Hierarchical Route Planning Based on Taxi GPS-Trajectories", Geoinformatics, 2009 17th International Conference on. IEEE, 2009, pp. 1-5.
Xin-min Tang et al., "Aircraft Taxi Route Planning for a-SMGCS Based on Discrete Event Dynamic System Modeling", Computer Modeling and Simulation, 2010. ICCMS'10. Second International Conference, vol. 1, IEEE, 2010, pp. 224-228.
Junghoon Lee et al., "A Telematics Service System Based on the Linux Cluster", International Conference on Computational Science. Springer, 2007, pp. 660-667.
Andrey Glaschenko et al., "Multi-Agent Real Time Scheduling System for Taxi Companies", 8th International Conference on Autonomous Agents and Multiagent Systems (AAMAS 2009), Budapest, Hungary, 2009, pp. 29-36.
Der-Horng Lee et al., "A Taxi Dispatch System Based on Current Demands and Real-Time Traffic Conditions", Transportation Research Record: Journal of the Transportation Research Board, No. 1882, Jan. 2004, pp. 193-200.
Lingyu Zhang et al., "A Taxi Order Dispatch Model based on Combinatorial Optimization", KDD 2017 Applied Data Science Paper, Aug. 13-17, 2017, Halifax, Canada, pp. 2151-2159.
Christos H. Papadimitriou et al., Combinatorial Optimization: Algorithms and Complexity, Courier Corporation, 1998.
Fanvi Verma et al., "Augmenting Decisions of Taxi Drivers Through Reinforcement Learning for Improving Revenues", Proceedings of the 27th International Conference on Automated Planning and Scheduling, ICAPS 2017, pp. 409-417.
Zhe Xu et al., "Large-Scale Order Dispatch in On-Demand Ride-Hailing Platforms: A Learning and Planning Approach", Proceedings of the 24th ACM SIGKDD International Conference on Knowledge Discovery and Data Mining, ACM 2018, pp. 905-913.
Christopher J.C.H. Watkins et al., "Q-Learning", Machine Learning, vol. 8, No. 3-4, May 1992, pp. 279-292.
Volodymyr Mnih et al., "Human-level control through deep reinforcement learning", Nature, vol. 518, No. 7540, Feb. 26, 2015, pp. 529-533.
Matthew E. Taylor et al., "Transfer Learning for Reinforcement Learning Domains: A Survey", Journal of Machine Learning Research, vol. 10, 2009, pp. 1633-1685.
Sinno Jialin Pan et al., "A Survey on Transfer Learning", IEEE Transactions on Knowledge and Data Engineering, vol. 22, No. 10, 2010, pp. 1345-1359.
James Kirkpatrick et al., "Overcoming catastrophic forgetting in neural networks", Proceedings of the National Academy of Sciences, vol. 114, No. 13, 2017, pp. 3521-3526.
Fee Whye Teh et al., "Distral: Robust Multitask Reinforcement Learning", Advances in Neural Information Processing Systems, 2017, pp. 4499-4509.
Andrei A. Rusu et al., "Progressive Neural Networks", arXiv: 1606.04671 v3 [cs.LG] Sep. 7, 2016.
Emilio Parisotto et al., "Actor-Mimic: Deep Multitask and Transfer Reinforcement Learning", arXiv:1511.06342v4 [cs.LG] Feb. 22, 2016.
Irina Higgins et al., "DARLA: Improving Zero-Shot Transfer in Reinforcement Learning", Proceedings of the 34th International Conference on Machine Learning, Sydney, Australia. PMLR 70. 2017.
Andreas Maurer et al., "The Benefit of Multitask Representation Learning", Journal of Machine Learning Research, vol. 17, No. 1, 2016, pp. 2853-2884.
Zelun Luo et al., "Label Efficient Learning of Transferable Representations across Domains and Tasks", Advances in Neural Information Processing Systems, 2017, pp. 164-176.
Zhaodong Wang et al., "Improving Reinforcement Learning with Confidence-Based Demonstrations", Proceedings of the 26th International Conference on Artificial Intelligence (IJCAI), Aug. 2017, pp. 3027-3033.
Hado Van Hasselt, "Deep Reinforcement Learning with Double Q-Learning", Proceedings of the 30th AAAI Conference on Artificial Intelligence (AAAI-16), 2016, pp. 2094-2100.
G.E. Hinton et al., "Reducing the Dimensionality of Data with Neural Networks", Science, vol. 313, Jul. 28, 2006, pp. 504-507.

\* cited by examiner

Algorithm 1 Double-DQN with spatio-temporal action search

1: Given: historical trips pool $\mathcal{P}$, a constant $C$.
2: Initialize replay memory $\mathcal{M}$ to capacity $N$ and insert the terminal transitions set $\{x : x_{s_1} \text{ is terminal}\}$.
3: Initialize the state-action value network $Q$ with random weights $\theta_0$.
4: Initialize the target state-action value network $\hat{Q}$ with weights $\hat{\theta}_0$.
5: for $t = 1, 2, \cdots, T$ do
6:     Remove a trip sample $(s_0, r, s_1)$ from $\mathcal{P}$, where $s_0 = (l_0, t_0), s_1 = (l_1, t_1)$.
7:     Extract action $a$ from $s_1$. Store transition $(s_0, a, r, s_1)$ in $\mathcal{M}$.
8:     Sample a random mini-batch $\{(s_j, a_j, r_j, s_{j+1})\}$ from $\mathcal{M}$.
9:     For each $s_{j+1}$, perform action search in Algorithm 2 and get $\hat{A}$.
10:     if $s_{j+1}$ is a terminal state then
11:         $y_j \leftarrow r_j$
12:     else
13:         $y_j \leftarrow r_j + \gamma \hat{Q}(s_{j+1}, \arg\max_{a' \in \hat{A}} Q(s_{j+1}, a'|\theta_{t-1})|\hat{\theta}_{t-1})$
14:     end if
15:     Perform a gradient descent step on $\theta$ per loss function $(y_j - Q(s_j, a_j|\theta))^2$ and get $\theta_t$.
16:     if $t \mod C = 0$ then
17:         $\hat{\theta}_t \leftarrow \theta_t$
18:     end if
19:     Perform experience augmentation described in Specification
20: end for
21: return $Q$

FIG. 3D

Algorithm 2 Spatio-temporal action search

1: Given $s = (l_0, t_0)$; $t'$ is search time limit.
2: $\mathcal{A} \leftarrow \{\}$
3: $T_{max} \leftarrow \min(T, t_0 + t')$
4: if $\tilde{\mathcal{A}}(s) \neq \emptyset$ then
5: $\quad \mathcal{A} \leftarrow \mathcal{A} + \tilde{\mathcal{A}}(s)$
6: else
7: $\quad$ for $t = t_0, t_0 + 1, \cdots, T_{max}$ do
8: $\quad\quad s' \leftarrow (l_0, t)$
9: $\quad\quad$ if $\tilde{\mathcal{A}}(s') \neq \emptyset$ then
10: $\quad\quad\quad \mathcal{A} \leftarrow \mathcal{A} + \tilde{\mathcal{A}}(s')$
11: $\quad\quad\quad$ break
12: $\quad\quad$ end if
13: $\quad$ end for
14: $\quad$ if $\mathcal{A}$ did not change from line 6 then
15: $\quad\quad \mathcal{A} \leftarrow \mathcal{A} + s'$
16: $\quad$ end if
17: $\quad$ for $L = 1, \cdots, L_{max}$ do
18: $\quad\quad$ if $B'(s, L) \neq \emptyset$ then
19: $\quad\quad\quad \mathcal{A} \leftarrow \mathcal{A} + \tilde{\mathcal{A}}'(s, L)$
20: $\quad\quad\quad$ break
21: $\quad\quad$ end if
22: $\quad$ end for
23: $\quad$ if $\mathcal{A}$ did not change from line 17 then
24: $\quad\quad \mathcal{A} \leftarrow \mathcal{A} + B'(s, L_{max})$
25: $\quad$ end if
26: end if
27: return $\mathcal{A}$

FIG. 3E

400 

402: Obtaining information on a location of a vehicle and a time to input into a trained second neural network algorithm

404: Based on a policy generated from the trained second neural network algorithm, obtaining action information for the vehicle, the action information comprising: staying at a current position of the vehicle, re-positioning the vehicle, or accepting a ride order.

The second neural network algorithm is trained with one or more first network weights and with second ride order dispatching data associated with a second region in a second training to obtain one or more second network weights.

The one or more first network weights are obtained from training a first neural network algorithm with first ride order dispatching data associated with a first region in a first training.

The second neural network algorithm comprises an input layer, a first sequence of hidden layers, a second sequence of hidden layers, and an output layer.

Each of the hidden layers in the first sequence has an output correspondingly coupled to one of the hidden layers in the second sequence and the output layer.

For the input layer, the second ride order dispatching data comprises (1) one or more second state inputs for inputting into the second sequence of hidden layers and (2) one or more first state inputs for inputting into the first sequence of hidden layers.

452: Obtaining information on a location of a vehicle and a time to input to a trained second neural network algorithm

454: Based on a policy generated from the trained second neural network algorithm, obtaining action information for the vehicle, the action information comprising: staying at a current position of the vehicle, re-positioning the vehicle, or accepting a ride order

456: Cause the action information to be played on a device associated with a driver of the vehicle

FIG. 4B

SYSTEM AND METHOD FOR RIDE ORDER DISPATCHING

CROSS REFERENCE TO RELATED APPLICATION

This application is a national phase application of International Application No. PCT/CN2018/089931, filed on Jun. 5, 2018, and entitled "System And Method For Ride Order Dispatching," the entire contents of which are incorporated herein by reference.

TECHNICAL FIELD

This disclosure generally relates to methods and devices for ride order dispatching.

BACKGROUND

A vehicle dispatch platform can automatically allocate transportation requests to corresponding vehicles for providing transportation services. Each vehicle driver is rewarded for providing the transportation service. However, it has been challenging to determine a ride order dispatching method that maximizes the gain for each vehicle driver.

SUMMARY

Various embodiments of the present disclosure can include systems, methods, and non-transitory computer readable media configured to dispatch ride order. According to one aspect, a method for ride order dispatching may comprise obtaining information on a location of a vehicle and a time to input into a trained second neural network algorithm; and based on a policy generated from the trained second neural network algorithm, obtaining action information for the vehicle, the action information comprising: staying at a current position of the vehicle, re-positioning the vehicle, or accepting a ride order. The policy may maximize a cumulative reward for a driver of the vehicle. The second neural network algorithm is trained with one or more first network weights and with second ride order dispatching data associated with a second region in a second training to obtain one or more second network weights. The one or more first network weights are obtained from training a first neural network algorithm with first ride order dispatching data associated with a first region in a first training. The second neural network algorithm comprises an input layer, a first sequence of hidden layers, a second sequence of hidden layers, and an output layer. Each of the hidden layers in the first sequence has an output correspondingly coupled to one of the hidden layers in the second sequence and the output layer. For the input layer, the second ride order dispatching data comprises (1) one or more second state inputs for inputting into the second sequence of hidden layers and (2) one or more first state inputs for inputting into the first sequence of hidden layers. The first sequence comprises the one or more first network weights; the one or more first network weights are frozen in the second training; and the output of each of the hidden layers in the first sequence is determined based on the corresponding hidden layer in the first sequence and the corresponding first network weight.

In some embodiments, the non-transitory computer readable media may couple to a processor and comprise instructions that, when executed by the processor, cause the processor to preform various method described herein. The instructions may comprise the trained first neural network algorithm, the trained second neural network algorithm, and/or the policy (e.g., the trained first and second neural network algorithms and the policy may be associated with memory locations in the media).

In some embodiments, the first neural network algorithm has a same network structure as the second neural network algorithm; the first neural network algorithm comprises another input layer, a third sequence of hidden layers, a fourth sequence of hidden layers, and another output layer; each of the hidden layers in the third sequence has another output correspondingly coupled to one of the hidden layers in the fourth sequence and the another output layer; for the another input layer, the first ride order dispatching data comprises (1) one or more third state inputs for inputting into the third sequence of hidden layers and (2) one or more fourth state inputs for inputting into the fourth sequence of hidden layers; before the first training, the one or more first network weights are trainable weights between neighboring layers among the another input layer, the third sequence of layers, and the another output layer; and after the first training, the trained one or more first network weights are correspondingly transferred to the first sequence for the second training.

In some embodiments, the second neural network algorithm comprises a third sequence of hidden layers outputted to the output layer; for the input layer, the second ride order dispatching data further comprises one or more action inputs for inputting into the third sequence of hidden layers; the action input is associated with at least one of staying, repositioning, or accepting an assignment; the state input is associated with at least one of: geo-coordinates of a simulated vehicle, time, or statistics of demand, supply, and order fulfillment within a distance range from the geo-coordinates; and the output layer comprises a state-action value output associated with a cumulative reward.

In some embodiments, the second state inputs comprise state inputs that are locality-dependent; and the first state inputs comprise state inputs that are locality-independent.

In some embodiments, the second state inputs comprise a spatio-temporal vector; and the first state inputs comprise a spatio-temporal displacement vector and one or more real-time contextual features. The spatio-temporal displacement vector comprises a change in geo-coordinates of a simulated vehicle and a change in time. The real-time contextual features comprise at least one of: a real-time number of idle drivers; a real-time number of orders created in a past time period; a bubble count of customer Application use; an average pick-up waiting time for passengers in another past time period; or a number of orders answered by drivers in yet another past time period.

In some embodiments, the second sequence of hidden layers comprise layers $B_x$, X being 1, 2, ... N; the input layer is coupled to the layer $B_1$; the layer $B_N$'s output is coupled to the output layer; the layer $B_x$'s output is coupled to the layer $B_{x+1}$ as an input, except for the layer the layer $B_N$; the first sequence of hidden layers comprise layers $A_x$; the input layer is coupled to the layer $A_1$; the layer $A_N$'s output is coupled to the output layer; the layer $A_x$'s output is coupled to the layer $A_{x+1}$ as an input, except for the layer the layer $A_N$; the layer $A_x$'s output is coupled to the layer $B_{x+1}$ as an input, except for the layer the layer $A_N$; the couplings between the input layer and the layer $B_1$, between neighboring layers in the second sequence, and between layer $B_N$ and the output layers are associated with the second network weights; and the couplings between the input layer and the layer $A_1$, between neighboring layers in the first sequence, and between layer $A_N$ and the output layers are associated with the first network weights. Layer $B_x$ is obtained based on layer $A_{x-1}$ and layer $B_{x-1}$; and the output layer is obtained based on layer $A_N$ and layer $B_N$.

In some embodiments, for training the first neural network algorithm, the first network weights are updated to obtain a first policy, the first policy maximizing the cumulative reward with respect to the first region; and for training the second neural network algorithm, the second network weights are updated to obtain a second policy, the second policy maximizing the cumulative reward with respect to the second region.

According to another aspect, a system for ride order dispatching, implementable on a server, may comprise a processor and a non-transitory computer-readable storage medium storing instructions that, when executed by the processor, cause the system to perform a method. The method comprises: obtaining information on a location of a vehicle and a time to input into a trained second neural network algorithm; and based on a policy generated from the trained second neural network algorithm, obtaining action information for the vehicle, the action information comprising: staying at a current position of the vehicle, re-positioning the vehicle, or accepting a ride order. The second neural network algorithm is trained with one or more first network weights and with second ride order dispatching data associated with a second region in a second training to obtain one or more second network weights. The one or more first network weights are obtained from training a first neural network algorithm with first ride order dispatching data associated with a first region in a first training. The second neural network algorithm comprises an input layer, a first sequence of hidden layers, a second sequence of hidden layers, and an output layer. Each of the hidden layers in the first sequence has an output correspondingly coupled to one of the hidden layers in the second sequence and the output layer. For the input layer, the second ride order dispatching data comprises (1) one or more second state inputs for inputting into the second sequence of hidden layers and (2) one or more first state inputs for inputting into the first sequence of hidden layers.

According to another aspect, a non-transitory computer-readable storage medium may store instructions that, when executed by a processor, cause the processor to perform a ride order dispatching method. The method comprises: obtaining information on a location of a vehicle and a time to input to a trained second neural network algorithm; based on a policy generated from the trained second neural network algorithm, obtaining action information for the vehicle, the action information comprising: staying at a current position of the vehicle, re-positioning the vehicle, or accepting a ride order; and causing the action information to be played on a device associated with a driver of the vehicle. The second neural network algorithm is trained with one or more first network weights and with second ride order dispatching data associated with a second region in a second training to obtain one or more second network weights. The one or more first network weights are obtained from training a first neural network algorithm with first ride order dispatching data associated with a first region in a first training. The second neural network algorithm comprises an input layer, a first sequence of hidden layers, a second sequence of hidden layers, and an output layer. Each of the hidden layers in the first sequence has an output correspondingly coupled to one of the hidden layers in the second sequence and the output layer. For the input layer, the second ride order dispatching data comprises (1) one or more second state inputs for inputting into the second sequence of hidden layers and (2) one or more first state inputs for inputting into the first sequence of hidden layers.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the invention are utilized, and the accompanying drawings of which:

FIG. 3D illustrates an exemplary algorithm for ride order dispatching, in accordance with various embodiments.

FIG. 3E illustrates another exemplary algorithm for ride order dispatching, in accordance with various embodiments.

FIG. 3L(a)-(c) represent training curves, FIG. 3L(d)-(f) represent testing rewards at different checkpoints during the training.

FIG. 3M(a)-(c) represent training curves, FIG. 3M(d)-(f) represent testing rewards at different checkpoints during the training.

FIG. 4A illustrates a flowchart of an exemplary method for ride order dispatching, in accordance with various embodiments.

FIG. 4B illustrates a flowchart of an exemplary method for ride order dispatching, in accordance with various embodiments.

DETAILED DESCRIPTION

Figure 1:
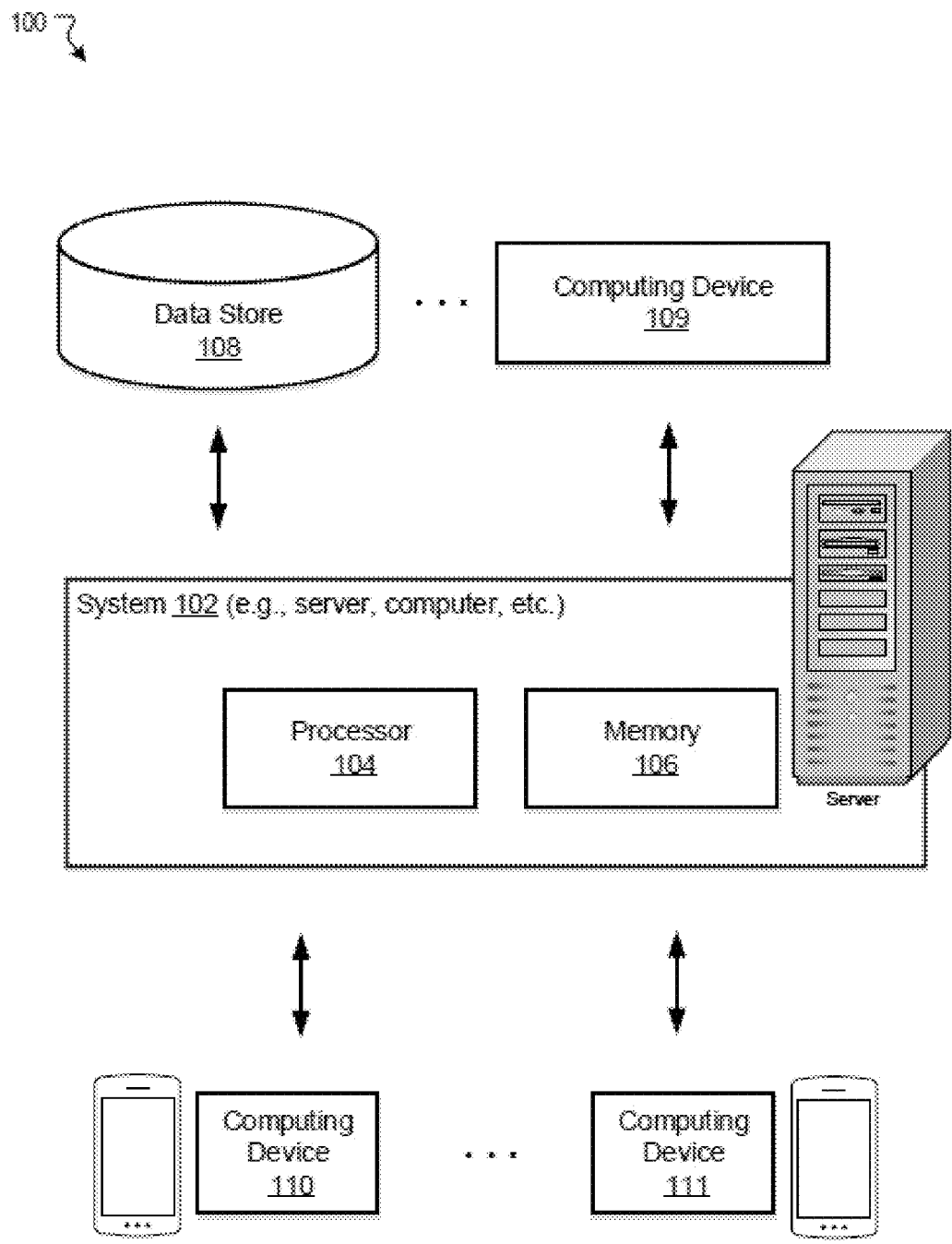
FIG. 1 illustrates an exemplary system for ride order dispatching, in accordance with various embodiments.

Vehicle platforms may be provided for transportation services. Such vehicle platform may also be referred to as a vehicle hailing or vehicle dispatching platform, accessible through devices such as mobile phones installed with a platform application. Via the application, users (ride requesters) can transmit transportation requests (e.g., a pick-up location, a destination, a current location of the user) to the vehicle platform. The vehicle platform may relay the requests to vehicle drivers based on various factors (e.g., proximity to the location of the requester or the pick-up location). The vehicle drivers can choose from the requests, and each can pick one to accept, fulfill the request, and be rewarded accordingly. After each trip, the vehicle driver may search for more requests or receive more requests from a push-based dispatching platform, and the results may vary depending on the demand for the vehicle service. For example, the results may return many requests if the vehicle is at a bar area on a weekend night, or may return no request if the vehicle is at a far-flung trip on a weekday evening.

To maximize the gain for the vehicle drivers (e.g., during a day), it is important for the vehicle platform to help them make the smartest decisions, for example suggesting the driver to wait, re-position, or accept a trip when displaying the results. The disclosed systems and methods can train a machine learning algorithm based on historical data such as various trips and rewards with respect to time and location, to obtain an optimal policy that surpasses the decision making policy reflected in the historical data in terms of reward maximization. Based on the machine-generated policy, the vehicle platform can automatically dispatch vehicles and help the vehicle drivers to obtain more earnings each day than simply relying on personal experiences, thus improving their efficiency of work.

Some existing machine learning technique only considers location states of the vehicle when it is idle (no customer on board). Such method is inadequate since customer trips will affect the location transitions of the vehicle. At least mitigating the deficiencies of the existing art, the disclosed systems and methods model the problem of single-driver (agent) order dispatching in terms of a single driver making a sequence of trip taking decisions to maximize the total revenue throughout the day. This problem may be approached by a Markov Decision Process (MDP), by which the state-action value function of the driver is estimated to produce an optimal policy that governs the decision-making at each step. This state-action value function indicates how good a decision made at a particular location and time of the day with respect to the long-term objective of value maximization. In various embodiments, a model-free reinforcement learning (RL) approach with function approximation is adopted for determining ride order dispatching. For example, a deep Q-network (DQN) framework is used, where the state-action value function is approximated by a multi-layer neural network (or multi-layer perceptron (MLP)). The resulting Q-network can be used as a component in a multi-driver dispatching system. Based on learning in a state space and/or an action space, the state-action value function learns to maximize the possible future revenues at each state-location of the driver, using transitions historical trip data. The simulation yields a policy that help the vehicle platform to manage ride order dispatching in real life.

Some existing method uses performs policy evaluation in a discrete tabular state space, which has several limitations. Due to the tabular form of the value function, the model representation is unique for each city. However, traffic patterns are usually different across different cities, causing the corresponding policy for each city to vary significantly. If a new model is built for every new city, the efficiency is held low. In addition, the state evaluation can vary based on different real-time factors such as traffic supply and demand, but it is generally difficult for a tabular model to incorporate and respond to such contextual information in real time. In other words, the agent has to be able to generalize beyond the historical data. Moreover, trips in different cities constitute different MDPs that also share a lot common structures. The tabular approach treats each MDP separately and does not provide a viable mechanism for knowledge to transfer across cities. Further, the policy improvement in existing technologies is a separate step that has to be performed on-line for at least one day. To converge, it usually takes dozens of evaluation-improvement iterations which can take weeks.

To overcome the problems in existing art, an order dispatching framework based on Q-learning is disclosed. This disclosed systems and methods can obtain an off-policy method which learns more efficiently while avoiding the risk of learning directly on-line. Compared with the unique tabular state space, using deep networks as the policy model is more advantageous for deployment across different cities. The machine learning algorithm used by the disclosed systems and methods may comprise a combination of modified neural network (e.g., deep neuron network (DNN)) and reinforcement learning (RL) algorithm. The combination with RL algorithm obviates the requirements for correct inputs and outputs and sub-optimal action corrections, harnessing the power of DNN in a scalable fashion. Further, as described below in various embodiments (e.g., FIG. 3F), effectively reusing previously trained networks may be used to improve the learning efficiency. Even though traffic patterns are usually different in different cities, they may still share some properties in common. For example, the rush-hour traffic demand between downtown and uptown may be similar across different cities, Instead of treating each policy's optimization as a fresh problem, the previously trained networks models can be reused in training a new network model for a large system. Efficiency improvement of computation power usage is achieved since a new model no longer needs to be built for every new city.

Various embodiments of the present disclosure include systems, methods, and non-transitory computer readable media configured to determine and dispatch ride order or otherwise provide a sequence of decisions that can maximize the total revenue of a vehicle driver throughout a period, e.g., a day. In some embodiments, a method for ride order dispatching may comprise obtaining information on a location of a vehicle and a time (e.g., a time-of-day) to input into a trained second neural network algorithm; and based on a policy generated from the trained second neural network algorithm, obtaining action information for the vehicle. The action information may comprise: staying at a current position of the vehicle, re-positioning the vehicle, accepting a ride order, or other actions. The second neural network algorithm is trained with one or more first network weights and with second ride order dispatching data associated with a second region in a second training to obtain one or more second network weights. The one or more first network weights are obtained from training a first neural network algorithm with first ride order dispatching data associated with a first region in a first training. The second neural network algorithm comprises an input layer, a first sequence of hidden layers, a second sequence of hidden layers, and an output layer. Each of the hidden layers in the first sequence has an output correspondingly coupled to one of the hidden layers in the second sequence and the output layer. For the input layer, the second ride order dispatching data comprises (1) one or more second state inputs for inputting into the second sequence of hidden layers and (2) one or more first state inputs for inputting into the first sequence of hidden layers. The disclosed systems and methods are advantageous at least in terms of: higher jumpstart (better performance at the beginning of learning), faster learning towards convergence, and higher convergence performance.

In some embodiments, the present disclosure provides a computing system for ride order dispatching. The computing system may comprise a server configured to obtain information on a location of a vehicle and a time to input to a trained second neural network algorithm; based on a policy generated from the trained second neural network algorithm, obtain action information for the vehicle, the action information comprising: staying at a current position of the vehicle, re-positioning the vehicle, accepting a ride order, or other actions; and cause the action information to be played on a device associated with a driver of the vehicle.

FIG. 1 illustrates an exemplary system 100 for dispatching ride order, in accordance with various embodiments. As shown in FIG. 1, the exemplary system 100 can comprise at least one computing system 102 that includes one or more processors 104 and memory 106. The memory 106 may be non-transitory and computer-readable. The memory 106 may store instructions that, when executed by the one or more processors 104, cause the one or more processors 104 to perform various operations described herein. The system 102 may be implemented on or as various devices such as mobile phone, tablet, server, computer, wearable device (smart watch), etc. The system 102 above may be installed with appropriate software (e.g., platform program, etc.) and/or hardware (e.g., wires, wireless connections, etc.) to access other devices of the system 100.

The system 100 may include one or more data stores (e.g., a data store 108) and one or more computing devices (e.g., a computing device 109) that are accessible to the system 102. In some embodiments, the system 102 may be configured to obtain data (e.g., first training data and second training data such as location, time, and fees for multiple historical vehicle transportation trips) from the data store 108 (e.g., a database or dataset of historical transportation trips) and/or the computing device 109 (e.g., a computer, a server, a mobile phone used by a driver or passenger that captures transportation trip information such as time, location, and fees). The system 102 may use the obtained data to train the algorithm for ride order dispatching. The location may comprise GPS (Global Positioning System) coordinates of a vehicle.

The system 100 may further include one or more computing devices (e.g., computing devices 110 and 111) coupled to the system 102. The computing devices 110 and 111 may comprise devices such as cellphone, tablet, computer, wearable device (smart watch), etc. The computing devices 110 and 111 may transmit or receive data to or from the system 102.

In some embodiments, the system 102 may implement an online information or service platform. The service may be associated with vehicles (e.g., cars, bikes, boats, airplanes, etc.), and the platform may be referred to as a vehicle (service hailing or ride order dispatching) platform. The platform may accept requests for transportation, identify vehicles to fulfill the requests, arrange for pick-ups, and process transactions. For example, a user may use the computing device 110 (e.g., a mobile phone installed with a software application associated with the platform) to request transportation from the platform. The system 102 may receive the request and relay it to various vehicle drivers (e.g., by posting the request to mobile phones carried by the drivers). A vehicle driver may use the computing device 111 (e.g., another mobile phone installed with the application associated with the platform) to accept the posted transportation request and obtain pick-up location information. Fees (e.g., transportation fees) can be transacted among the system 102 and the computing devices 110 and 111. Some platform data may be stored in the memory 106 or retrievable from the data store 108 and/or the computing devices 109, 110, and 111. For example, for each trip, the location of the origin and destination (e.g., transmitted by the computing device 111), the fee, and the time can be obtained by the system 102.

In some embodiments, the system 102 and the one or more of the computing devices (e.g., the computing device 109) may be integrated in a single device or system. Alternatively, the system 102 and the one or more computing devices may operate as separate devices. The data store(s) may be anywhere accessible to the system 102, for example, in the memory 106, in the computing device 109, in another device (e.g., network storage device) coupled to the system 102, or another storage location (e.g., cloud-based storage system, network file system, etc.), etc. Although the system 102 and the computing device 109 are shown as single components in this figure, it is appreciated that the system 102 and the computing device 109 can be implemented as single devices or multiple devices coupled together. The system 102 may be implemented as a single system or multiple systems coupled to each other. In general, the system 102, the computing device 109, the data store 108, and the computing device 110 and 111 may be able to communicate with one another through one or more wired or wireless networks (e.g., the Internet) through which data can be communicated. Various aspects of the system 100 are described below in reference to FIG. 2 to FIG. 5.

Figure 2:
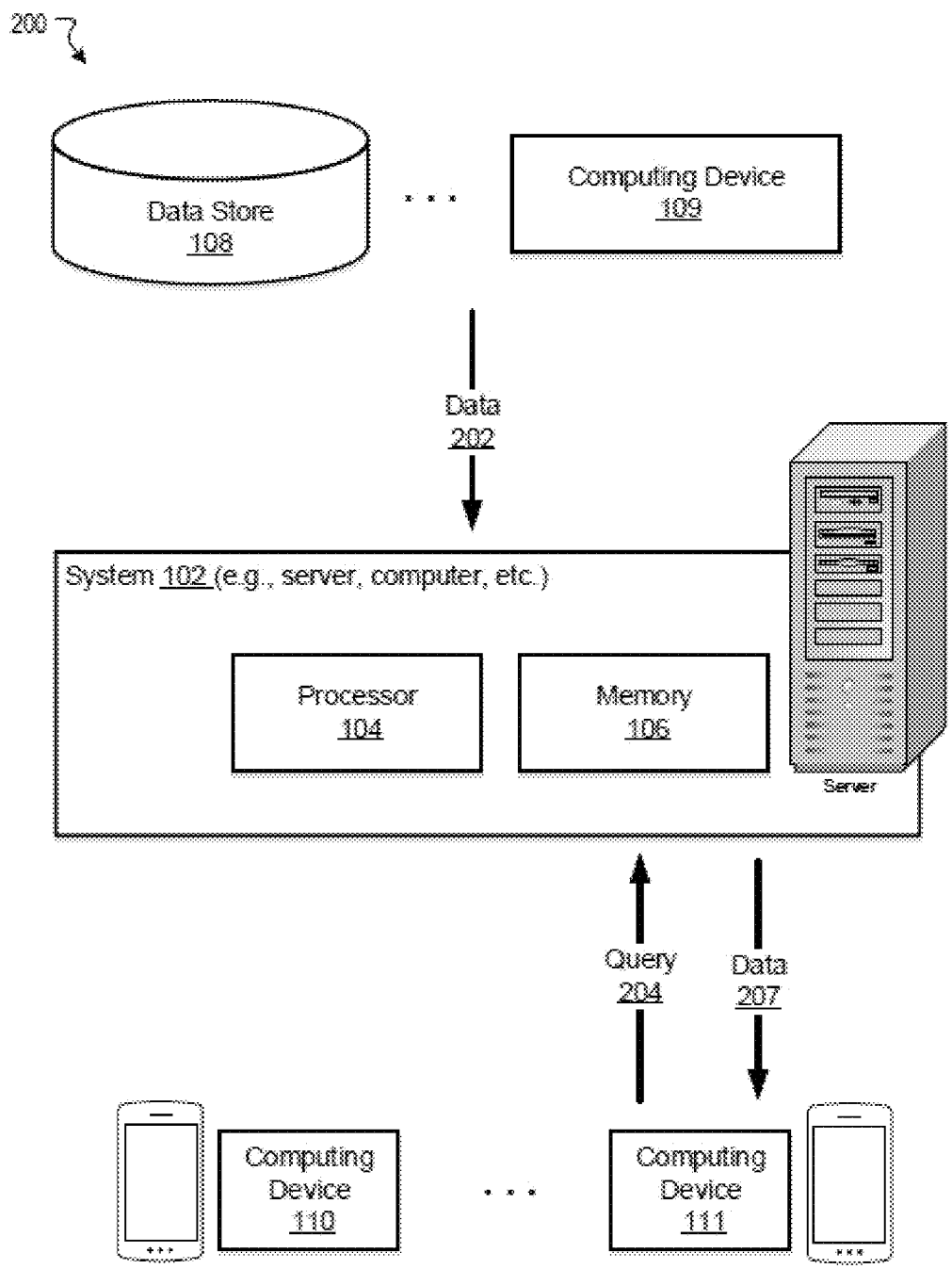
FIG. 2 illustrates an exemplary system for ride order dispatching, in accordance with various embodiments.

FIG. 2 illustrates an exemplary system 200 for dispatching ride order, in accordance with various embodiments. The operations shown in FIG. 2 and presented below are intended to be illustrative. In various embodiments, the system 102 may obtain data 202 (e.g., first and second training data comprising the state, action, and reward described below for historical trips) from the data store 108 and/or the computing device 109. The obtained data 202 may be stored in the memory 106. The system 102 may train an algorithm with the obtained data 202 to learn a model for dispatching ride order. The algorithm of learning a model without providing a model may be referred to as model-free reinforcement learning algorithm. The computing device 111 may transmit query 204 to the system 102. The computing device 111 may be associated with a driver of a service vehicle including, for example, taxis, service-hailing vehicle, etc. The query 204 may comprise information such as a current location of the vehicle, a current time, a completed trip (origin, destination, time, fees), etc. Accordingly, the system 102 may send data 207 to the computing device 111 or one or more other devices. The data 207 may comprise an instruction or recommendation for an action, such as waiting at the current position, re-positioning to another location, accepting a new request, etc.

As mentioned, the machine learning algorithm used by the disclosed systems and methods may comprise a combination of modified (e.g., deep neural network (DNN)) and reinforcement learning (RL) algorithm. The RL algorithm may be model-free with function approximation, e.g., in a deep Q-network (DQN) framework, where the state-action value function is approximated by a multi-layer neural network or multi-layer perceptron (MLP). A resulting Q-network can be used as a component in a multi-driver dispatching system. In various embodiments, to produce an optimal policy that governs the decision-making at each step, a corresponding state-action value function (described below) of the driver may be estimated. This function can show how good a decision made at a particular location and time of the day with respect to the long-term objective. The machine learning algorithm or a system or device that at least partially implements the machine learning algorithm may be referred to as an "agent." For training, the agent takes an action in a defined environment, a reward can be assigned for a given behavior (e.g., a ride fee for fulfilling a ride order, nothing for waiting) assuming that the vehicle driver follows the determination of the agent, and over time through reinforcement learning algorithm, the agent can learn to reproduce that behavior to maximize the rewards and help the vehicle driver make the best decisions.

Figure 3A:
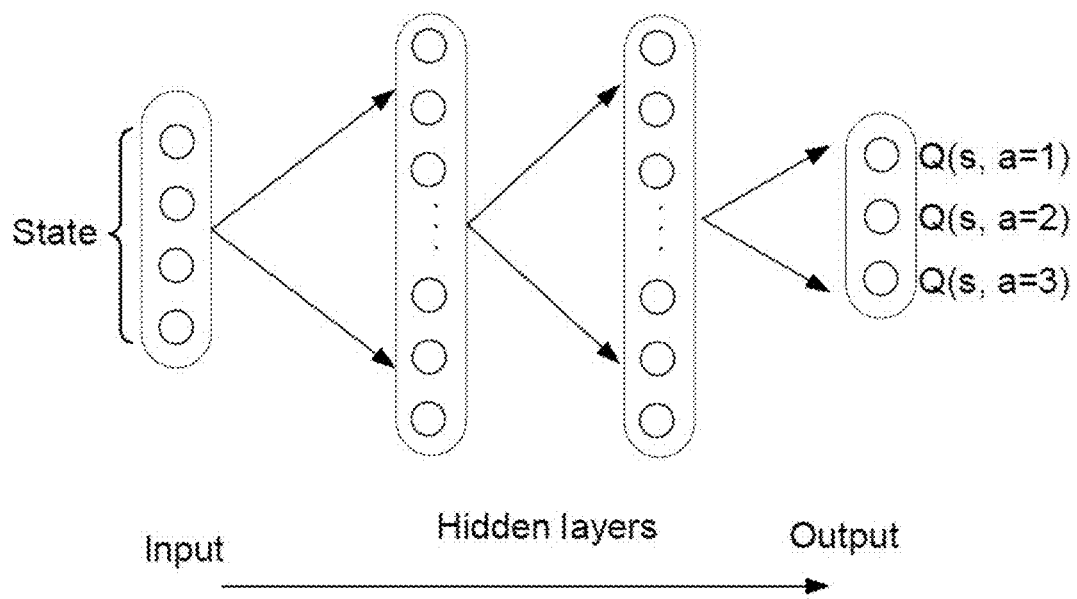
FIG. 3A illustrates an exemplary neural network framework, in accordance with various embodiments.
Figure 3B:
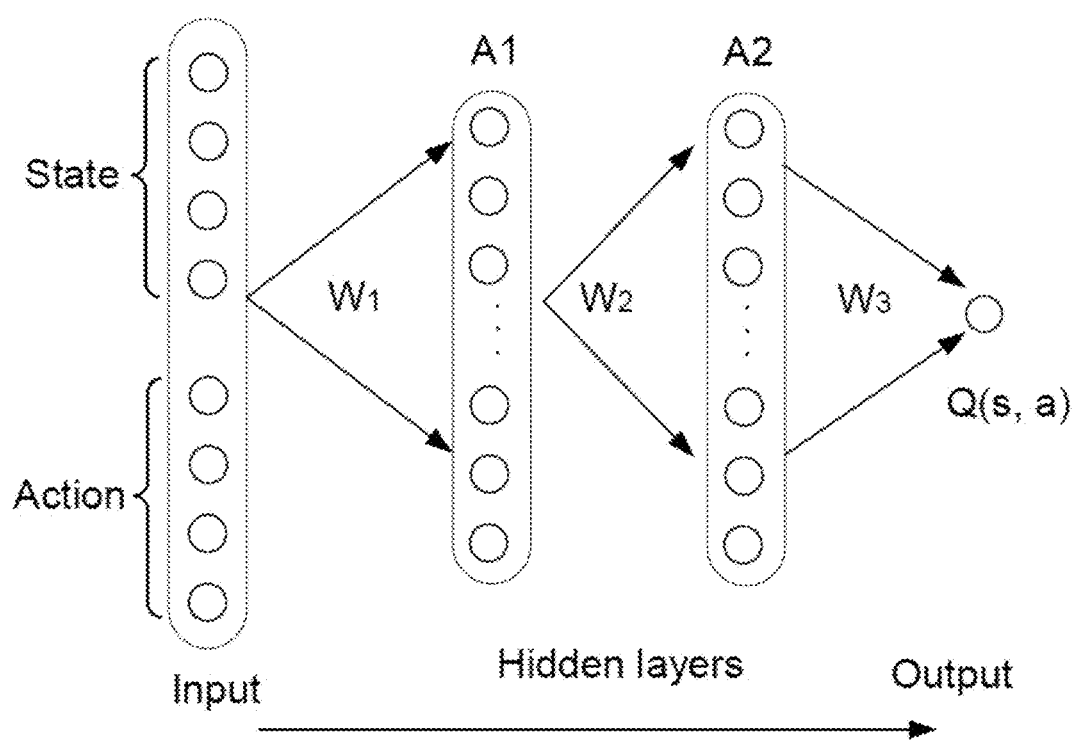
FIG. 3B illustrates an exemplary neural network framework for ride order dispatching, in accordance with various embodiments.

In deep neural networks, neurons may serve as the basic building block. A neuron may receive an input signal (e.g., input data), process it using a logistic computation function, and transmit an output signal (e.g., output data) depending on the computation outcome. When these neurons are arranged into networks of neurons, they are termed as neural networks. Each column of neurons in the network is called a layer, and a network can have multiple layers with multiple neurons in each layer. Network with single neuron is called perceptron and network with multiple layers of neurons is called multi-layer perceptron (MLP). For example, a two hidden layer MLPs (layer $A_1$ and layer $A_2$) are shown in FIG. 3B, where the input layer comprises the inputs (state inputs and action inputs) to the network. The input layer is also called the visible layer because this may be the only exposed part of the network. Hidden layers derive features from the input layer at different scales or resolutions to form high-level features and output a value or a vector of values at the output layer. At each hidden layer, the network may compute the features as:

$$A_1 = f(W_1 * X)$$

$$A_2 = f(W_2 * A_1)$$

$$Q = f(W_3 * A_2)$$

Where, f is the function which takes the combination of weights (e.g., $W_1$, $W_2$, $W_3$) and outputs at the previous layer and outputs a value. Function f can be identical for all the hidden layers or can be different. A1, A2, and Q are the successive outputs of first hidden layer, second hidden layer, and the final output layer. For a given row of data X as an input to network, the network may process the input to obtain A1, A2 and finally obtain the predicted output Q. This can be called forward pass.

The weights of the neural network need to be updated by training to accurately reflect the decision making process. In a regular DNN, the predicted output Q can be compared with an expected output (e.g., independently verified result, manually obtained result, cross-checked result) to compute an error using a loss function. This error is then propagated back through the network using a backpropagation algorithm to update the weights $W_1$, $W_2$, $W_3$ for each layer according to stochastic gradient descent, one layer at a time. This can be called backward pass. In some embodiments, RL algorithm is used in combination with DNN to compute a loss function based on target and prediction and based on which, update the weights of neural network using backpropagation, as detailed below.

A RL algorithm builds on a Markov decision process (MDP), and the environment for ride order dispatching can be formulated as a MDP. In various embodiments, the agent interacts with the environment in discrete steps. At each step, the agent executes an action (e.g., waiting, re-positioning, accepting a ride order), and correspondingly from the environment, the agent receives an observation (e.g., a reward and a next state described below). That is, the agent chooses an action from a set of available actions, and the agent moves to a new state, and the reward associated with the transition is determined. In one exemplary transition, the driver is matched to a trip order, spends time to travel to the trip origin location, and the trip moves the driver to the destination location and time, for which the driver earns an immediate reward (trip fee) from this transition. The goal of the agent is to collect as much reward as possible. To further describe the MDP formulation, some of the terminologies are described below. The disclosed MDP formulation uses more granular state and action information and learns a state-action value function.

State, s: the geo-coordinates of the driver and time (e.g., time-of-day in seconds) when the driver picks up a trip order. For example, s=(l, t), where l is the GPS coordinates pair (latitude, longitude), and t is time. s may be different from the actual origin of the transportation trip corresponding to the picked trip order, s may contain additional features that characterize the spatio-temporal space (l, t), e.g., statistics of demand, supply, and order fulfillment within the vicinity of (l, t), denoted as f. For example, s could be extended as (l, t, f). Further, time for weekday and weekend can be differentiated due to different transportation demands and patterns.

Action, a: the action is assignment (e.g., passenger pick-up and transportation assignment) of a particular trip to the driver, defined by the trip destination and drop-off time. Hence, a state-action pair is $(s_0, s_1)$.

Reward, r: the total fee collected for the trip.

Episode: one complete day, from 0:00 am to 23:59 pm. Hence, a terminal state is a state with t component corresponding to 23:59 pm. Alternatively, other episode definitions for a time frame can be used.

State-action value function, Q(s, a): expected cumulative reward that the driver will gain till the end of an episode if the vehicle driver starts at state s and takes an action a. Here, $Q(s, a) = E[\Sigma_{t=0}^{T} \gamma^t R(S_t, A_t) | S_0 = s, A_0 = a]$, where S, A, and R are stochastic variable version of s, a, and r. T is the number of steps till the terminal state, and γ is the discount factor for the future rewards. In the training of the disclosed systems and methods, γ can be set, for example, to 0.9. The state-action value function can be also referred to as Q function or Q value. This Q-value function gives the expected total reward for performing action a at state s, under policy π (described below), with discount factor γ.

State value function, V(s): expected cumulative reward that the driver will gain till the end of an episode if the driver starts at state s. Assuming that a greedy policy with respect to the Q function is used, the state value $V(s)=\max_{a \in A} Q(s, a)$.

Policy, π(a|s): a function that maps a state s to a distribution over the action space (stochastic policy) or a particular action (deterministic policy). The greedy policy with respect to a learned Q(s, a) is given by $\pi(s)=\max_a Q(s, a)$.

In various embodiments, action search can be added to an existing DQN framework to obtain an improved neural network architecture. FIG. 3A illustrates an example DQN without action search. The DQN assumes a small discrete action space and uses only the state as input and multiple outputs corresponding to the action value for each action (e.g., Q(s, a=1), Q(s, a=2), and Q(s, a=3)). The maximum of the outputs is used to update the neural network. The FIG. 3B illustrates an exemplary DQN with action search for ride order dispatching, according to some embodiments of this disclosure. This network structure of DQN with action search may be applied to the various machine learning algorithms (e.g., first machine learning algorithm, second machine learning algorithm) described herein. In the architecture in FIG. 3B, both state s and action a are used as the network inputs to obtain the Q-value as the single output. The hidden layers can be fully-connected layers or convolutional layers, depending on the application. There can be many more hidden layers than those two shown in FIG. 3B. A pseudo code (Algorithm 1) corresponding to FIG. 3B is provided in FIG. 3D. The description of DQN below may refer to the DQN in FIG. 3B.

Therefore, in some embodiments, the neural network algorithm may comprise: an input layer comprising one or more action inputs and one or more state inputs, one or more hidden layers, and an output layer comprising a state-action value output. The action may comprise a destination and a drop-off time associated with performing a vehicle trip. The state may comprise geo-coordinates of the vehicle and a pick-up time associated with the vehicle trip. The state-action value may comprise a cumulative reward. The input layers, the hidden layers, and the output layer may be in a sequence and every two neighbor layers may be associated with one or more weights.

In some embodiments, training the neural network algorithm may comprise: modeling the vehicle trips by passing the inputs through the hidden layers to obtain the output, and updating the weights to obtain the policy, the policy associated with performing the action at the corresponding state and maximizing the cumulative reward. Each vehicle trip may be associated with a first state corresponding to an origin, a second state corresponding to a destination, an action corresponding to fulfilling a ride order from the origin to the destination, and a reward corresponding to fees for the ride.

The DQN (e.g., embodied in the state-action value function) is to be trained with training data for various episodes until, for example, the state-action value function converges. The network can be updated after each taken action or in mini-batches of, for example, a few actions taken. Each mini-batch can be viewed as a small set of sample points on the state-action (Q) value function. Such mini-batches would be highly correlated. Previous experiences can be kept in memory (e.g., the memory 106 described above), and after each action taken, a mini-batch of experiences can be drawn from that memory to perform the update. In one example, the mini-batch update through backpropagation solves a bootstrapped regression problem with the following loss function in the DQN framework:

$$\left(Q(s_0, a \mid \theta) - r(s_0, a) - \gamma \max_{a' \in A} Q(s_1, a' \mid \theta')\right)^2 \quad (1)$$

where θ' comprises the weights for the Q-network of the previous iteration (similar to the weights $W_1$, $W_2$ described above for the corresponding layer), and A is the action space. Here, $Q(s_0, a|\theta)$ may represent the prediction: the approximated Q function of the neural network with predicted weights θ; and $$r(s_0, a) + \gamma \max_{a' \in A} Q(s_1, a' \mid \theta')$$

may represent the targets. The loss function can be used to update the neural network, for example, θ' can be updated with θ.

To further improve training stability, double-DQN can be used. For example, a target Q-network $\hat{Q}$ is maintained and synchronized periodically with the original Q-network. The targets in (1) is modified so that the argmax is evaluated by the target network:

$$r(s_0, a) + \gamma \hat{Q}\left(s_1, \operatorname*{argmax}_{a' \in A} Q(s_1, a'|\theta')|\hat{\theta}'\right) \quad (2)$$

That is, the deep neural network may comprise two deep-Q networks. The targets $$r(s_0, a) + \gamma \max_{a' \in A} Q(s_1, a' \mid \theta') \text{ in } (1)$$

can be replaced by (2), and the difference between (2) and $Q(s_0, a|\theta)$ can be used to update the neural network.

In some embodiments, different from the vanilla DQN algorithm, no simulation environment may be involved in training, and the agent is trained on historical data. For example, historical trips data can be used as training transitions (training data). Since DQN is an off-policy algorithm, learning the value of the optimal policy can be performed independently of the agent's online actions to generate the training data. Each trip x defines a transition of the agent's states $(s_0, a, r, s_1)$, where current state $s_0=(l_0, t_0)$ comprises the vehicle driver's location and time when the action is performed, the action a comprises the assigned trip, the reward is the total fee collected for this trip, and the next state $s_1=(l_1, t_1)$ is the drop-off location and time. Since an episode is defined by a day, $s_1$ can be set in all those transitions where the trip crosses midnight to be terminal state. All state vectors may be pre-processed, for example, normalized with their population mean and standard deviation. These transitions (experiences) are retrieved from the data store one by one (as if they were generated from a simulator) and can be stored in a replay memory, and each iteration samples a mini-batch from this replay memory. For use as the training data, the transitions may not be generated from a simulator and may not form complete episodes.

As described, the action search can be incorporated to the disclosed system and methods, and an action takes the form a=(l, t). Since both the GPS coordinates and time are more or less continuous, computing the max-Q term in (1) exactly may not be tractable. In addition, the time (t-component) has dependency on the location (l-component) as it reflects the duration of the trip. Thus, random sampling from the action space may not be appropriate. In some embodiments, an approximation scheme can be used for computing action "a" by constructing an approximate feasible space for the actions, $\hat{A}(s)$, which makes explicit the dependency of the action space to the state "s" where the search starts. Instead of searching through all valid actions, the historical trips originating from the vicinity of s (e.g., within a threshold distance from s) can be searched:

$$\hat{A}(s) = \{x_{s_1} | x \in \chi, B(x_{s_0}) = B(s)\} \quad (3)$$

where x is the set of all trips, and B(s) is a discretized spatio-temporal bin that s falls into. For spatial discretization, the hexagon bin system can be used, and here, a hexagon bin can be represented by its center point coordinates. $x_{s_0}$ is the $s_0$ component of the trip x. For a larger search space, more computation is required for evaluating the value network at each action point. The number of actions allowed in the action search space can be tuned, and random sampling can be performed without replacement if necessary. The same search procedure can be used for policy evaluation, where the driver's trajectory for the day is simulated using historical trips data. Therefore, in some embodiments, modeling the vehicle trips may comprise: modeling a first vehicle trip to obtain the second state associated with the first vehicle trip, and searching from a spatio-temporal space to obtain an action to perform at the second state, the spatio-temporal space comprising at least one of a spatio threshold or a temporal threshold from the second state.

Figure 3C:
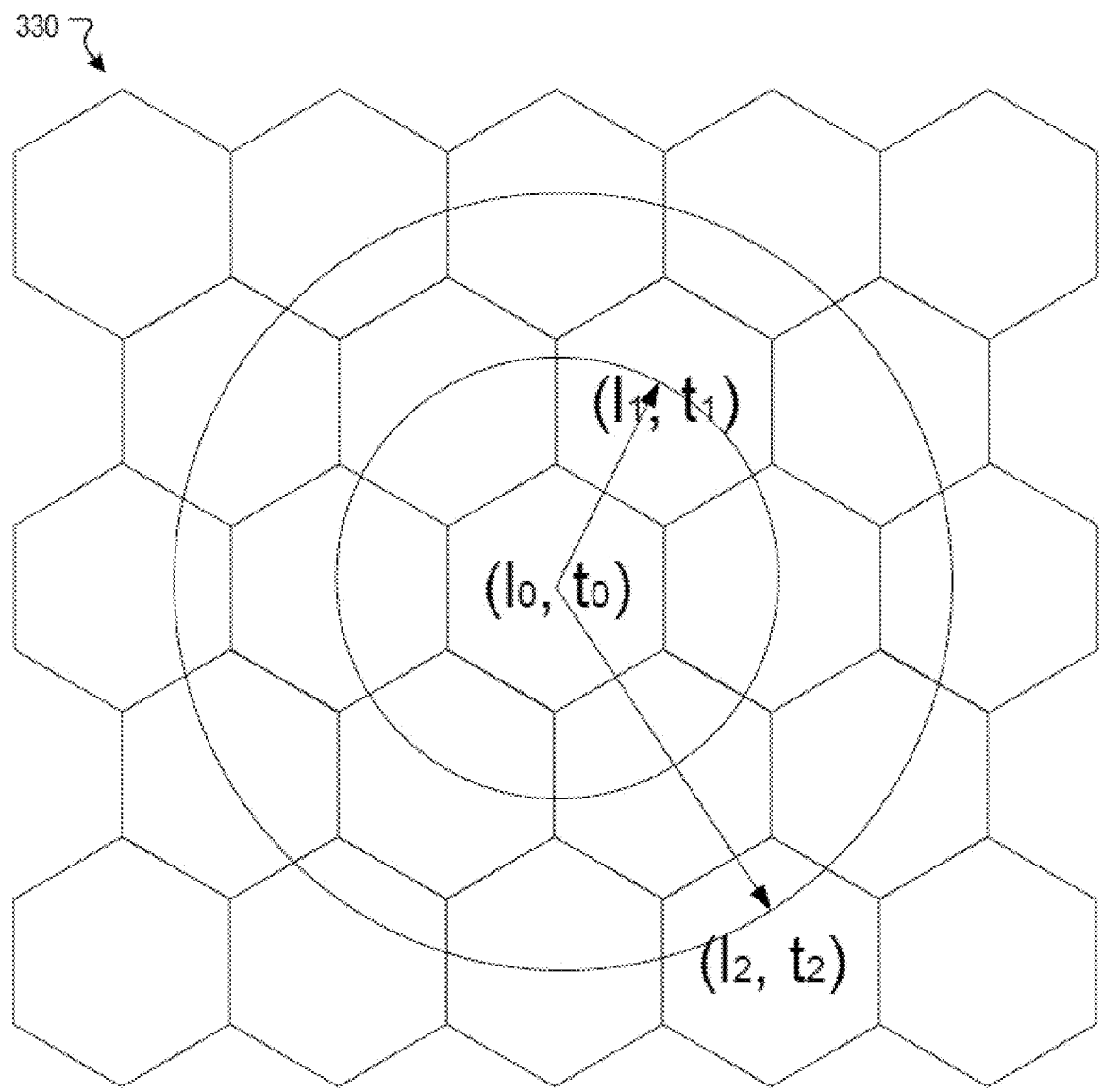
FIG. 3C illustrates an exemplary action search for ride order dispatching, in accordance with various embodiments.

Due to training data sparsity in certain spatio-temporal regions, e.g., remote areas in early morning, the above-described action search may return an empty set. Therefore, in some embodiments, an expanded action search can be performed in both spatial and temporal spaces. In one example, a first search direction is to stay at the last drop-off location and wait for a period of time, which corresponds to keeping the l-component $(s_l)$ constant and advancing $s_t$, till one of the following happens with s' being the searched state: (1) $\hat{A}(s')$ is non-empty, (2) a terminal state is reached, or (3) $s'_t$ exceeds the wait-time limit. For (1), $\hat{A}(s')$ is returned; for (2), the terminal state is returned; and for (3), s' is returned. In another example, a second search direction is through spatial expansion by searching the neighboring hexagon bins of s. The expanded action search may be in a layered manner, as shown in FIG. 3C. In FIG. 3C, the circle lines cover the first two layers of neighboring hexagon bins of $l_0$, and the arrows represent searches to hexagon bin centered at $l_1$ (first layer) at time $t_1 > t_0$ and hexagon bin centered at $l_2$ at time $t_2 > t_1$. The spatio-temporal bins covered by the inner red circle are $B'((l_0, t_0), 1)$.

For each layer L of hexagon bins, the search can be performed within the appropriate time interval to take into account the travel time required to reach the target hexagon bin from s. The travel time estimation can be obtained from a map service. The layer L neighboring spatio-temporal bins of s can be denoted by $B'(s, L)$, and the set of historical trips originating from any of the bins in $B'(s, L)$ can be denoted by:

$$\hat{A}'(s, L) = \{x_{s_1} | x \in \chi, B(x_{s_0}) \in B'(s, L)\} \quad (4)$$

The increase of L in the second search direction is stopped when $\hat{A}(s, L)$ is non-empty, and $\hat{A}(s, L)$ is returned. Otherwise, $B'(s, L_{max})$, the hexagon bins' center points and their associated time components, are returned. Algorithm 2 in FIG. 3E summarizes the action search.

Based on the definition of terminal state described above, Q(s, a) with $s_t$ near the end of the episode horizon would be close to zero regardless $s_l$. Thus, transitions with $s_l$ being a terminal state may be added to the replay buffer at the very beginning of training to help getting the terminal state-action values right early in training. This can help improve the model accuracy because the target values for the states $s_0$'s in the mini-batch updates of DQN are computed through bootstrapping on the values of states that are temporally after them. Since the training samples with a terminal state may form a small percentage of the entire data set, a uniform sampling would cause the values of many states far away from the terminals to be supervised with the incorrect targets, hence slowing down the learning process. Therefore, in some embodiments, data used for the training comprises a plurality of the vehicle trips each associated with a measurement period (e.g., episode), and the data used for the training comprises one or more terminal states each associated with an end of the measurement period.

This paragraph describes experience augmentation. In some embodiments, the original training data is the experience generated by the given historical policy. The historical policy may not explore the trajectory space well and may contain very few rare but important cases, such as transitions that require long waiting time or repositioning without a passenger before a trip starts. Such transitions are typical experiences when the driver is at a state, where few trips historically originated from. If the agent is only trained on the original trips data, it would not learn to make good decisions should the driver go into a rare state in the future (e.g., when the vehicle goes to an area where very few people request vehicle services and tries to pick up a vehicle request). Therefore, the original training experience may be supplemented with transitions obtained through action search. For example, for each time bin, a set of locations within the geographical boundary under consideration are randomly sampled. Accordingly, the action search and the expanded action search described above can be performed on the randomly sampled states, and the resulting transitions which require expanded action search can be added to the replay memory.

In some embodiments, the trained neural network provides a policy that beats the existing decision-making data in terms of cumulative reward, and the policy can be evaluated by the following method. Since the transitions data is historical and may not necessarily form complete episodes, a single-driver simulator can be built from the past trips data for evaluating the policy generated from the learned value function. For example, it can be assumed that after a driver drops off a passenger at the destination, and from the vicinity of the destination, the driver would be assigned a new trip request. The search space can be augmented as necessary following the expanded action search described above to cover the cases where there are no historical trip around the last drop-off area. The next move is selected by the given policy from the action search output, which may comprise fee-generating trips, wait actions, or re-position actions. The reward associated with the action is the actual trip fee, if the action involves a historical trip. Otherwise, the reward is zero (for waiting or repositioning). The simulation can be run for multiple episodes (days), and the cumulative reward gained can be computed and averaged over the episodes.

Methods for learning the optimal value function of a generic driver in a single-agent environment have been described above. Since the real environment is intrinsically multi-agent (multiple drivers roaming in the streets to pick up customers), the single-agent value function may be over-optimistic. That is, the single driver may not be able to pick up the "optimal" trip order determined by machine learning based on the single-agent assumption due to the presence of other drivers. In some embodiments, to learn a value function that is closer to reality, the $Q^\pi$ (the station action value-function Q with respect to a policy $\pi$) that generated the training data can be learned. To that end, the "argmax" in equation (2) can be replaced with "mean." The resulting algorithm is similar to Expected SARSA (state-action-reward-state-action algorithm). The value network is trained on targets that represent the average values that drivers would have over all possible actions under the policy. Dispatching policy that is greedy or collectively greedy shown below with respect to Q is a one-step policy improvement.

In some embodiments, in a multi-agent environment where multiple drivers fulfill passenger orders at the same time, at each decision point (dispatching), instead of assigning the best order to a driver through $$\underset{a \in A}{\mathrm{argmax}}\, Q(s, a) \qquad (5)$$

where s is the current state of the driver, a is a potential trip that can be assigned to this driver, and A represents all eligible trips that are within the broadcasting radius of the driver, orders collected within a dispatching window (e.g., two seconds) are assigned to a set of drivers to maximize the total value of the assignments. Thus, equation (5) becomes:

$$\underset{a \in A}{\mathrm{argmax}} \sum_{s \in S} Q(s, a(s)) \qquad (6)$$

where a(s) is an assignment function that assigns an order from the pool to a driver s, A is the space of all assignment functions for the order pool, and S is the set of available drivers (and their states). The matching part can be solved by a standard matching algorithm, e.g., the Hungarian Method (KM algorithm). That is, the single-driver value function may be used to compute the edge weights of the bi-partite graph for the KM algorithm. Such dispatching policy may be "collectively greedy" with respect to Q.

In some embodiments, a V-value function in tabular form is learned to compute the edge weights corresponding to the trip assignment x=(s, a, r, s'), where s is the driver's current spatio-temporal state (without contextual features), r is the estimated trip fee, and s' is the destination spatio-temporal state (without contextual features): $A_x$=r+V(B(s'))−V(B(s)). As r+V(B(s')) is a sample approximation of Q(s, a), $A_x$ is interpreted as the advantage associated with the trip assignment x. B(s) is the spatio-temporal bin associated with s. This disclosed method is able to generate the tabular V-function from the learned Q function as follows: For every spatio-temporal cell B(s) with cell center s, $$V^*(B(s)) = \max_{a \in \bar{A}} Q^*(s, a) \text{ for } Q^*, \text{ and } V^\pi(B(s)) = \underset{a \in \bar{A}}{\mathrm{mean}}\, Q^\pi(s, a) \text{ for } Q^\pi.$$

In some embodiments, transfer learning may be used to overcome the learning problem across different cities described earlier. The vehicle platform should be able to take charge of the orders in different regions such as different cities. Due to the realistic marketing operation, there has to be an individual policy model for each city. However, if treating the entire dispatching as a set of independent optimization problems for massive different cities, the computation cost is quite demanding. For example, with a 6-core CPU, single GPU computing resource setting, optimizing a dispatching policy model for a mid-sized city in China using one month's data will cost around thirty hours to converge. Under such scenarios, transferring some prior knowledge (e.g., reusing previously trained models) is a feasible solution. For example, trained network weights from the source city can be reused. More importantly, because of the non-convex property, deep learning would suffer from local optima, and if the training starts from a better initial point or follows a better gradient direction, which shall come from the knowledge transfer, it may reach a higher convergence performance.

Figure 3F:
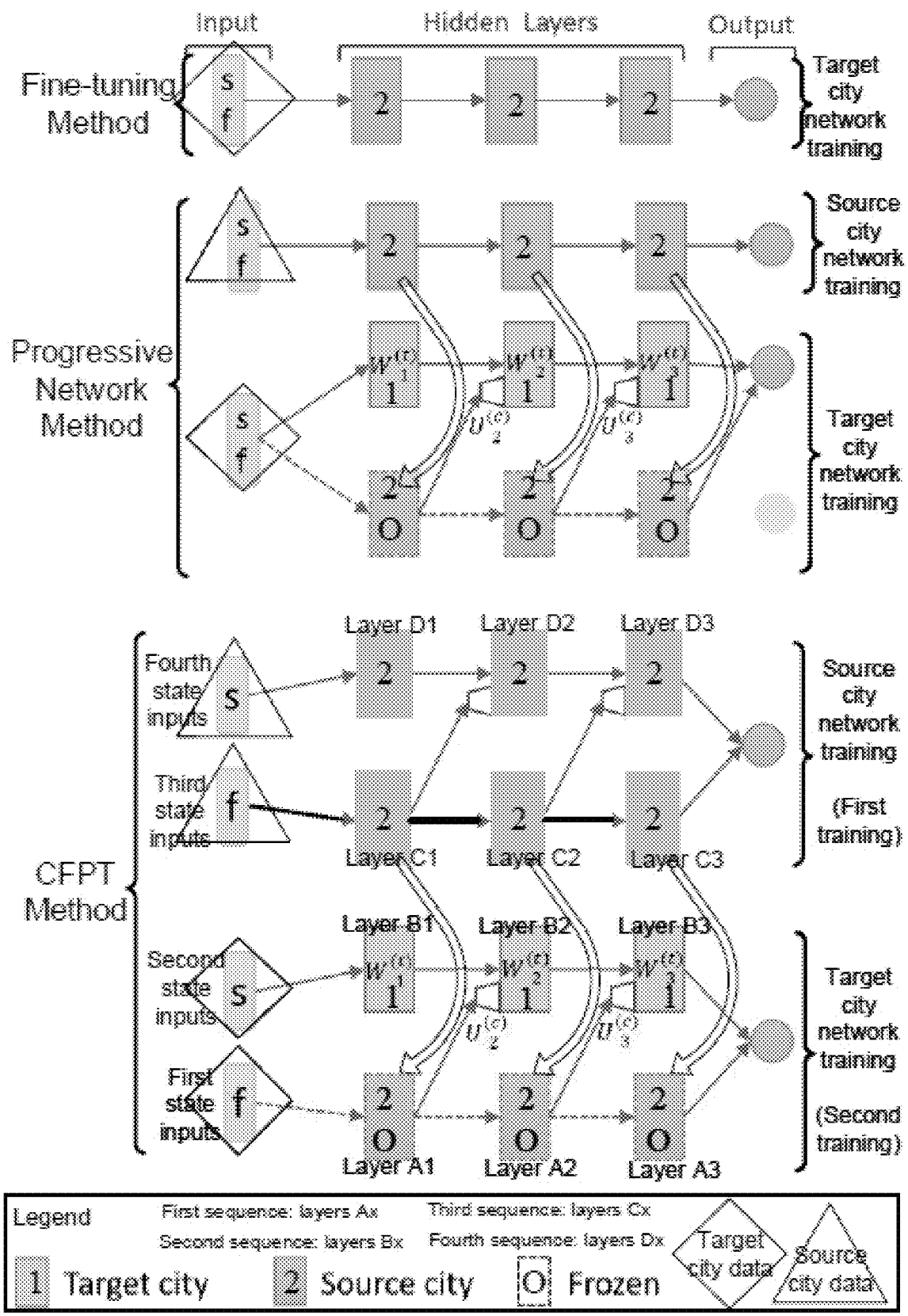
FIG. 3F illustrates three transfer methods: fine-tuning, progressive network, and correlated-feature progressive transfer (CFPT), in accordance with various embodiments.

Three methods can be used to help improve the training on the target cities: fine-tuning, progressive network, and correlated-feature progressive transfer (CFPT). Corresponding network structures of these three methods are shown in FIG. 3F. In this figure, only the target city network training (a second training) is shown for the fine-tuning method, while both source city network training (a first training) and target city network training (a second training) are shown for the progressive network method and the CFPT method.

For the fine-tuning method, its source city network (though not shown) is similar to its target city network (shown in this figure). After training the network on the source city in a first training, the trained weights are entirely transferred to the target city's network for a second training. During the first training, the weights are not frozen and are trainable. The source city data used for training may comprise "s" and "f" inputs of the data of the source city that are indiscriminately fed from an input layer to the hidden layers of the source city network. The scopes of "s" and "f" are described later in more details. After the first training, the trained weights are transferred over to the target city network as shown in this figure, and thus the layers as shown are labeled by "2" representing that such layers have been trained with the source city data and carry the trained weights. Similar to the first training, the target city data (labeled in a rhombus) used for the second training may comprise "s" and "f" inputs of the data of the target city that are indiscriminately fed from an input layer to the hidden layers of the target city network. The trained weights that are carried over to the target city network are initialized and left trainable on the data of the target city. Then, the network is fine-tuned via backpropagation.

For the progressive network method, the trained weights are leveraged via lateral connections to the target network. As shown, the source city network has a single sequence of input layer, hidden layer and output layer. In a first training, the "s" and "f" inputs of the data of the source city (labeled in a triangle) are indiscriminately fed from an input layer to the hidden layers of the source city network to train the weights between neighboring layers. After that, the trained weights of the source city network are transferred over (labeled by ribbon arrows) to some hidden layers (labeled by "2O") in the target city network. The "2O" represents that such hidden layers have been trained with the source city data. "O" stands for frozen. During the first training of the source city network with the data of the source city, the weights (e.g., $U_i^{(c)}$) are not frozen and are trainable. After the trained weights are transferred over to the target city network, the trained weights become frozen. Then, in a second training of the target network with the data of the target city, the "s" and "f" inputs of the data of the target city (labeled in a rhombus) are indiscriminately fed from an input layer to each of two sequences of hidden layers of the source city network. The frozen weights (e.g., $U_i^{(c)}$) are not trainable and not updated in the second training, while the output values of the layers "2O" obtained based on the inputs "s" and "f" and the frozen weights are fed into the layers "1" and the output layer correspondingly. The weights (e.g., $W_i^{(t)}$) between neighboring layers among the input layer, the hidden layers labeled with "1" and the output layer are updated, for example, via backpropagation. The connection function is defined as:

$$h_i^{(t)} = f(W_i^{(t)} h_{i-1}^{(t)} + U_i^{(c)} h_{i-1}^{(s)}) \quad (7)$$

Where $h_i^{(t)}$ and $h_i^{(s)}$ denote outputs of the layer 1 in the target and source network respectively, f( ) denotes an activation function, $W_i^{(t)}$ denotes the weight matrix of layer i of the current network, and $U_i^{(c)}$ are the lateral connection weights from the network of the source tasks.

In some embodiments, for the CFPT method, the trained weights are also leveraged via lateral connections to the target network. As shown, the source city network and the target city network may have the same structure: an input layer (alternatively, the two input parts "s" and "f" may be treated as two different input layers), two sequences of hidden layers, and an output layer. Different inputs are fed to the two sequences that output to the same output layer. Layer outputs from one sequence are coupled to and used in the other sequence.

For the CFPT method, in a first training, to train the weights between neighboring layers of the source city network, the "s" inputs of the data of the source city (fourth state inputs labeled in a triangle) are fed to a fourth sequence of hidden layers (layers D1, D2, D3, . . . ) of the source city network, and the "f" inputs of the data of the source city (third state inputs labeled in a triangle) are fed to a third sequence of hidden layers (layers C1, C2, C3, . . . ) of the source city network. The first training may follow the description of FIG. 3A or FIG. 3B above. After that, the trained weights of the source city network are transferred over (labeled by ribbon arrows) to a first sequence of hidden layers (layers A1, A2, A3, . . . labeled by "2O") in the target city network. The "2O" represents that such hidden layers have been trained with the source city data. "O" stands for frozen. During the first training of the source city network with the data of the source city, the weights (e.g., $U_i^{(c)}$) are not frozen and are trainable. After the trained weights are transferred over to the target city network, the trained weights become frozen. Then, in a second training of the target network with the data of the target city, to train the weights (e.g., $W_i^{(t)}$) between neighboring layers of the target city network, the "s" inputs of the data of the target city (second state inputs labeled in a rhombus) are fed to a second sequence of hidden layers (layers B1, B2, B3, . . . ) of the target city network, and the "f" inputs of the data of the target city (first state inputs labeled in a rhombus) are fed to a first sequence of hidden layers (layers A1, A2, A3, . . . ) of the target city network. The frozen weights (e.g., $U_i^{(c)}$) are not trainable and not updated in the second training, while the output values of the layers A1, A2, and A3 obtained based on the inputs "f" and the frozen weights are fed into the layers B2, B3, and the output layer. The connection function (7) described above may apply here for the CFPT method. The weights (e.g., $W_i^{(t)}$) between neighboring layers among the input layer, the second sequence of hidden layers, and the output layer are updated, for example, via backpropagation.

The CFPT method may solve the policy generation problem across different regions. In some embodiments, due to the variety of state spaces, not all state elements for the input layer are adaptive over different regions. For example, some state elements such as the historical geo-positions and time corresponding to various vehicles are locality-dependent and thus non-adaptive over different regions, while the historical displacements of the vehicles are locality-independent (that is, similar among average cities), and therefore adaptive over different regions. Accordingly, the network inputs of the input layer may be separated into two parts: s denoting elements that are intuitively not adaptable for the target city, and f denoting elements that are adaptable. The network input s may comprise: a spatio-temporal vector (e.g., historical geo-coordinates of a vehicle and associated timestamps) associated with the second ride order dispatching data. That is, the second state inputs comprise a spatio-temporal vector. The network input f may comprise: a spatio-temporal displacement vector and one or more real-time contextual features associated with the second ride order dispatching data. That is, f may be the concatenation of the spatio-temporal displacement vector and the real-time contextual features. Using the notations described above, a 3-tuple spatio-temporal displacement vector may be computed as $(s_1-s_0)$. Further, for the each $s_i=(l_i, t_i)$, the 5-tuple real-time contextual features contain one or more real-time event counts: 1) a real-time number of idle drivers, 2) a real-time number of orders created in a past time period (e.g., in the past one minute), 3) a bubble count of customer Application (App) use, 4) an average pick-up waiting time for passengers in a past time period (e.g., in the past five minutes), and/or 5) a number of orders answered by drivers in a past time period (e.g., in the past five minutes). That is, the first state inputs comprise a spatio-temporal displacement vector and one or more real-time contextual features. The spatio-temporal displacement vector comprises a change in geo-coordinates of a simulated vehicle and a change in time, the geo-coordinates associated with the time according to historical data. The real-time contextual features comprise at least one of: a real-time number of idle drivers; a real-time number of orders created in a past time period; a bubble count of customer Application use; an average pick-up waiting time for passengers in another past time period; or a number of orders answered by drivers in yet another past time period. Compared with the absolute GPS locations, the above eight correlated features are related to the statistics of dispatching demand, supply, and order fulfillment, which may be more adaptive as inputs across different cities.

Therefore, the CFPT method further improves the progressive network method when applied across different regions (e.g., cities). Instead of using a fully-connected network which takes all state inputs (both "s" and "f") in their entirety during source city training and target city training as in the progressive network method, a parallel progressive structure with two sequences of hidden layers may be built for both source city network and the target city network. Different inputs depending on their locality dependency may be fed to the two sequences, and the two sequences output to the same output layer (shown as a solid circle). The CFPT method is advantageous at least because: during the training stage of the source city, the network is already split into two parallel flows receiving inputs based on the locality dependency instead of indiscriminately taking all source city data. One of the sequences only takes care of the inputs f which are locality independent and therefore the correspondingly trained weights are more appropriate to reuse for another training in another region. This can significantly improve the training efficiency for the another region. The target city network training will benefit from such jumpstart, which means an increased initial performance at the start of the training. The number of neurons within each same-level layers of the two flows is half of the original fully-connected network, and this will reduce the number of total trainable parameters, thereby enhancing the learning efficiency. Efficient learning means that the convergence would happen earlier during training. Further, the convergence performance is improved.

In some embodiments, the target city network of the CFPT method described above and shown in FIG. 3F may be referred to as a second neural network algorithm, and the first sequence of the CFPT method (the source city model) may have been trained by the source city network, which may be referred to as a first neural network algorithm. The second neural network algorithm is trained with one or more first network weights (obtained from the training by the source city network) and with second ride order dispatching data associated with a second region (e.g., the target city) in a second training to obtain one or more second network weights (weights between neighboring layers among the input layer, the second sequence hidden layers and the output layer). The one or more first network weights (weights between neighboring layers among the input layer, the first sequence hidden layers and the output layer) are obtained from training a first neural network algorithm with first ride order dispatching data associated with a first region (e.g., the source city) in a first training. The second neural network algorithm comprises an input layer, a second sequence of hidden layers (e.g., the target city blocks 1 of layers B1, B2, and B3 of CFPT in FIG. 3F), a first sequence of hidden layers (e.g., the source city blocks 2O of layers A1, A2, and A3 of CFPT in FIG. 3F), and an output layer. Each of the hidden layers in the first sequence has an output correspondingly coupled to one of the hidden layers in the second sequence and the output layer. For the input layer, the second ride order dispatching data comprises (1) one or more second state inputs (e.g., input sub-space s) for inputting into the second sequence of hidden layers and (2) one or more first state inputs (e.g., input sub-space f) for inputting into the first sequence of hidden layers. The second sequence and the first sequence may have the same number of hidden layers. In some embodiments, the second state inputs comprise state inputs that are locality-dependent (the weights between layers would differ depending on the region from which training data is applied); and the first state inputs comprise state inputs that are locality-independent (the weights between layers would not differ depending on the region from which training data is applied).

In some embodiments, the first sequence comprises the one or more first network weights; the one or more first network weights are frozen in the second training; and the output of each of the hidden layers in the first sequence is determined based on the corresponding hidden layer in the first sequence and the corresponding first network weight. Thus, after passing down the input f, previously learned tasks in the first sequence with source city data can be laterally transferred to facilitate training the second sequence with target city data. For example, in CFPT, the second sequence may be initiated with random weights (which change during training). The first sequence may have weights from the previous training with the source city network, but are updated with the input f. The updated results are used to train the second sequence. For example, layer B2 may be obtained from a function of a sum of: (1) the layer B1 multiplies trainable weights and (2) the layer A1 multiplies updated weights.

In some embodiments, the first neural network algorithm has a same network structure as the second neural network algorithm; the first neural network algorithm comprises another input layer, a third sequence of hidden layers, a fourth sequence of hidden layers, and another output layer; each of the hidden layers in the third sequence has another output correspondingly coupled to one of the hidden layers in the fourth sequence and the another output layer; for the another input layer, the first ride order dispatching data comprises (1) one or more third state inputs for inputting into the third sequence of hidden layers and (2) one or more fourth state inputs for inputting into the fourth sequence of hidden layers; before the first training, the one or more first network weights are trainable weights between neighboring layers among the another input layer, the third sequence of layers, and the another output layer; and after the first training, the trained one or more first network weights are correspondingly transferred to the first sequence for the second training. The similar network structures between the source city network and the target city network can ensure that the trained weight of the source city network are readily usable in another training by mapping to the target city network.

In some embodiments, the same structure in FIG. 3B may be applied to CFPT. That is, the input layer can include both state inputs and action inputs. For example, the second neural network algorithm comprises a third sequence of hidden layers (not shown) outputted to the output layer; and for the input layer, the second ride order dispatching data further comprises one or more action inputs for inputting into the third sequence of hidden layers. That is, for the CFPT method in FIG. 3F, the third sequence of hidden layers may be similar to the second sequence of hidden layers: the input layer coupling to the third sequence at one end and the other end of the third sequence coupling to the output layer. Similarly, the action input may pass down hidden layers in the third sequence, and the output layer may be obtained based on the last layers of the first, second, and third sequences. Alternatively, the action input (in term of destination location) may be included in state input $s=(s_0, s_1)$. In some embodiments, the action input is associated with the second ride order dispatching data and is associated with at least one of staying, repositioning, or accepting an assignment; the state input is associated with at least one of: geo-coordinates of a simulated vehicle, time, or statistics of demand, supply, and order fulfillment within a distance range from the geo-coordinates; and the output layer comprises a state-action value output associated with a cumulative reward.

Referring to FIG. 3F, in some embodiments, the second sequence of hidden layers comprise layers $B_x$, X being 1, 2, ... N; the input layer is coupled to the layer $B_1$; the layer $B_N$'s output is coupled to the output layer; the layer $B_x$'s output is coupled to the layer $B_{x+1}$ as an input, except for the layer the layer $B_N$; the first sequence of hidden layers comprise layers $A_x$; the input layer is coupled to the layer $A_1$; the layer $A_N$'s output is coupled to the output layer; the layer $A_x$'s output is coupled to the layer $A_{x+1}$ as an input, except for the layer the layer $A_N$; and the layer $A_x$'s output is coupled to the layer $B_{x+1}$ as an input, except for the layer the layer $A_N$. Layer $B_x$ is obtained based on layer $A_{x-1}$ and layer $B_{x-1}$; and the output layer is obtained based on layer $A_N$ and layer $B_N$. The couplings between the input layer and the layer between neighboring layers in the second sequence, and between layer $B_N$ and the output layers are associated with the second network weights. The couplings between the input layer and the layer $A_1$, between neighboring layers in the first sequence, and between layer $A_N$ and the output layers are associated with the first network weights.

In some embodiments, for training the first neural network algorithm, the first network weights are updated to obtain a first policy, the first policy maximizing the cumulative reward with respect to the first region; and for training the second neural network algorithm, the second network weights are updated to obtain a second policy, the second policy maximizing the cumulative reward with respect to the second region.

In some embodiments, the performance of the disclosed dispatching algorithm is empirically evaluated, showing that the disclosed DQN policy network is capable of optimizing the order revenue. For example, performance evaluation has shown that the Algorithm 2 is capable of learning to optimize the order revenue. The evaluation process including the experiment settings and results is described below. For the evaluation process, the historical dataset is divided into training set (⅔) and testing set (⅓). Each mini-batch can be viewed as a small set of sample points on the Q (state-action) value function. A discount factor $\gamma=0.9$ is used. All state vectors are normalized with their population mean and standard deviation. This pre-processing is necessary for a stable training. For the training results, a sliding window of 1000 episodes is used to calculate the reward curve, and the total training duration is 40000 episodes. For the testing results, five testing points are set during training: 0%, 25%, 50%, 75%, 100%. At each checkpoint of training, a snapshot of the current network is taken and evaluated on the testing dataset for five trials of 100 episodes with random initial states.

Figure 3G:
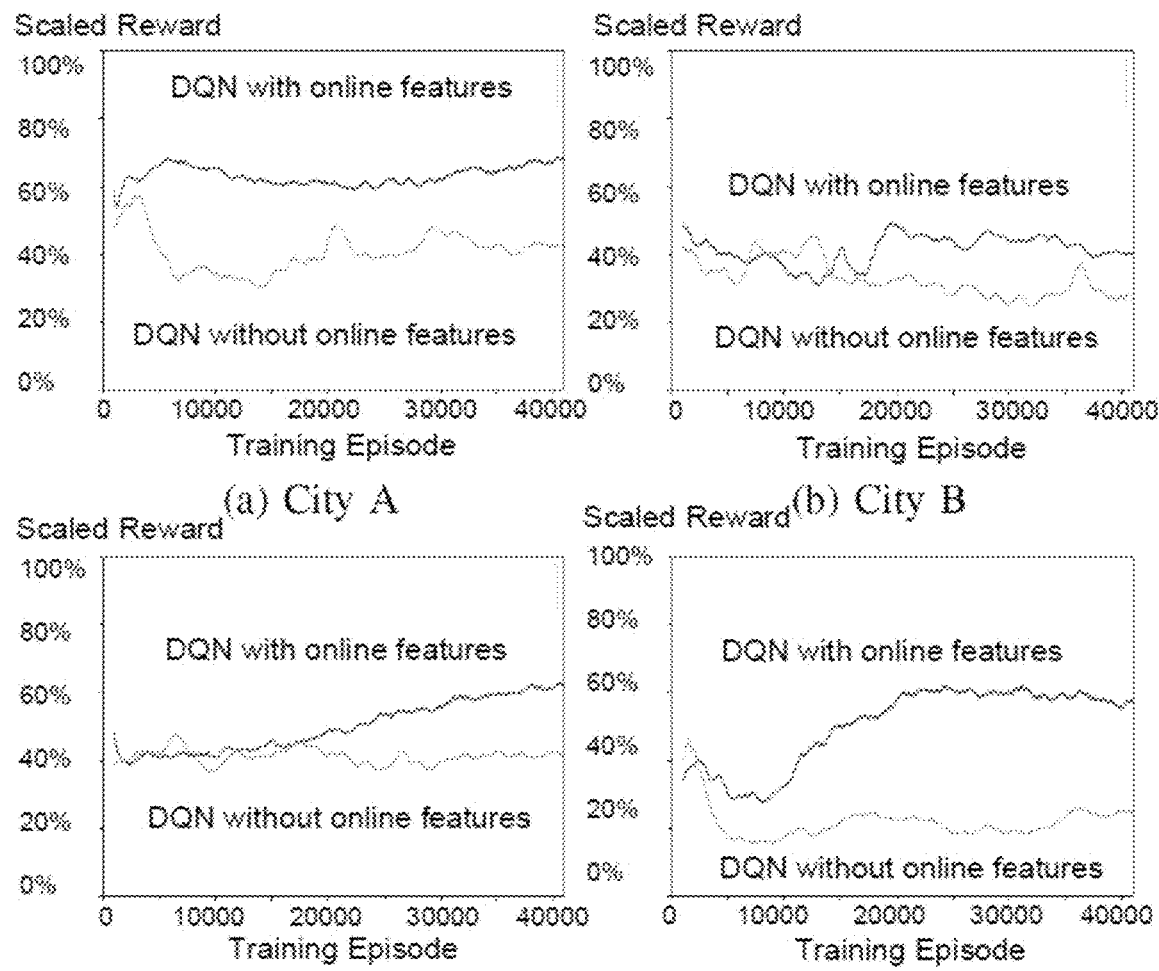
FIG. 3G illustrates performance comparisons between the two types of the inputs: original spatio-temporal state and state with expanded contextual feature, in accordance with various embodiments.

In some embodiments, for a single-agent evaluation environment, since the transitions data is entirely historical and does not necessarily form complete episodes, a single driver dispatching environment is built from the past trips data for a direct and explicit evaluation of the policy generated from the learned value function. It is assume that after a driver drops off a passenger at the destination, the driver would be assigned a new trip request starting from the vicinity of the previous destination. The search space can be augmented as necessary following the expanded search action to cover the cases where there is no historical trip around the last drop-off area. The next move is selected by the given policy from the action search output, which could be a combination of fee-generating trips or wait or reposition actions. The reward associated with the action is the actual trip fee if the action involves a historical trip; otherwise the reward is zero (for waiting or repositioning). The scaled reward percentage (with the same normalization constant for a given city) is used as the performance metric. The simulation is run for multiple episodes (days), and the cumulative reward gained is computed and averaged over the episodes. For plotting the training curves, the agent is stepped through this environment using a greedy policy with respect to the learned Q-value function at the same pace as the training steps. In addition to the original spatial-temporal input space, the contextual features may benefit the training, as shown in FIG. 3G. Hence in the following, the expanded state space is used as the network input.

In some embodiments with respect to baseline DQN training, the disclosed neural network for Q value function is trained with one month of trips data of four cities in China, denoted by A, B, C, and D. They span different sizes of population and geographical regions as summarized in Table 1.

TABLE 1

| City | Size | Region |
| --- | --- | --- |
| A | Large | Northeastern |
| B | Small | Southeastern |
| C | Medium | Southeastern |
| D | Large | Northwestern |

Figure 3H:
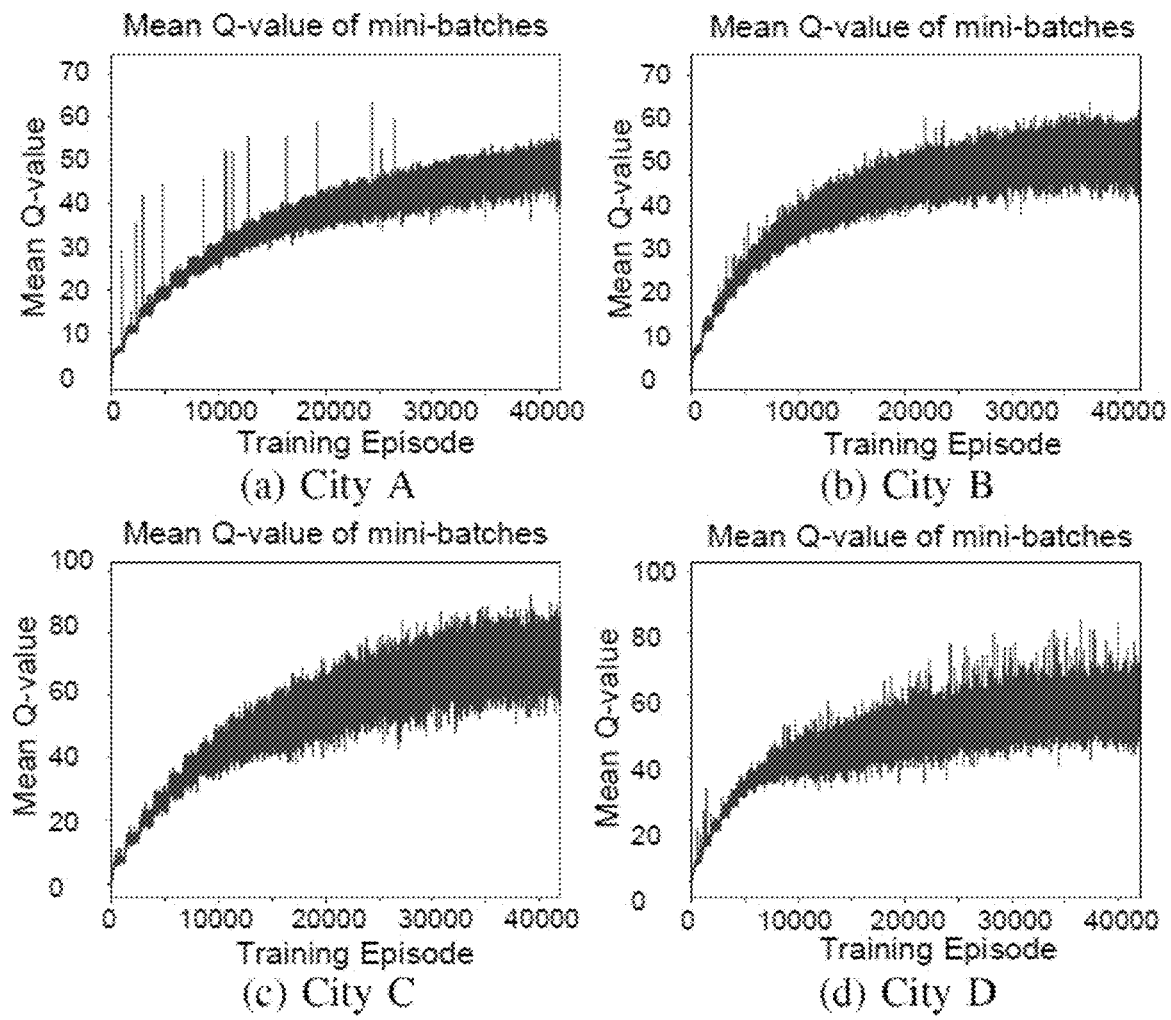
FIG. 3H illustrates average Q values of the training mini-batches, in accordance with various embodiments.
Figure 3I:
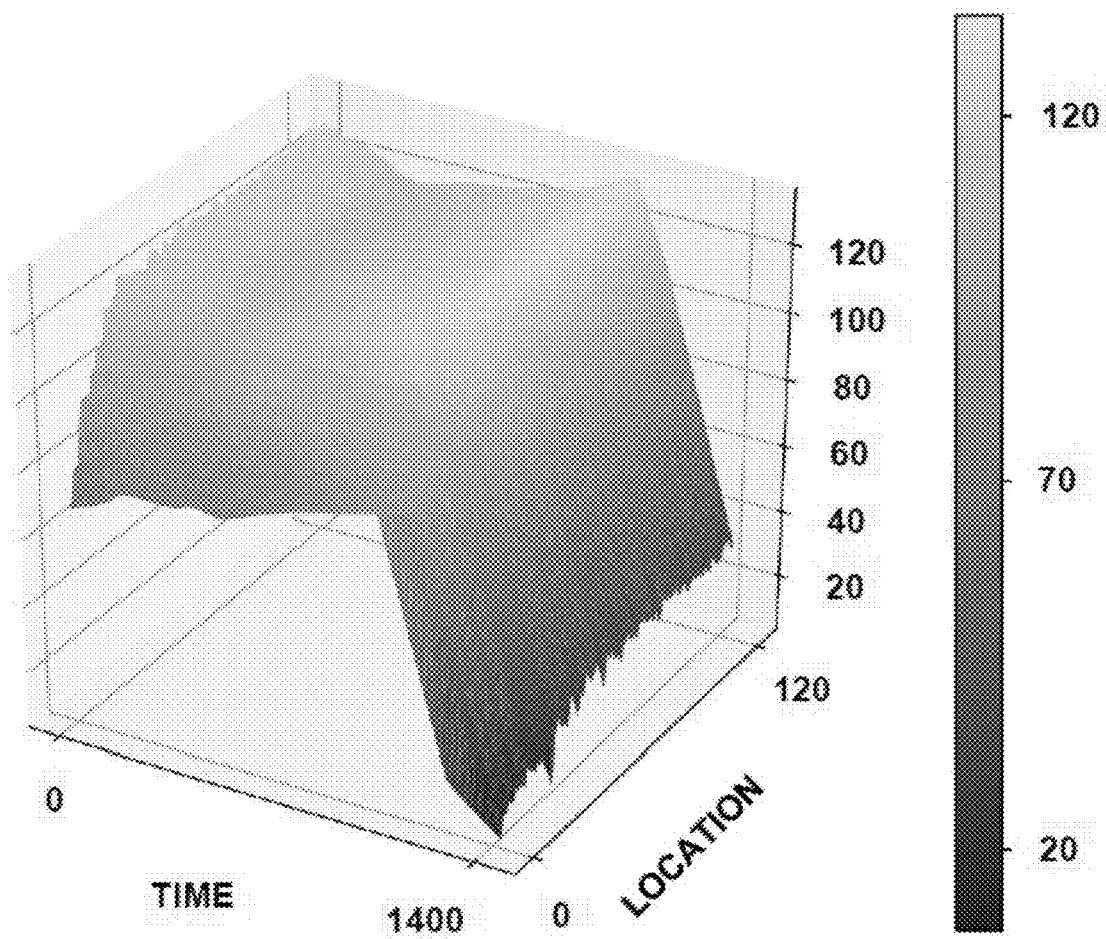
FIG. 3I illustrates V-values of 120 sampled location bins in City D, in accordance with various embodiments.
Figure 3J:
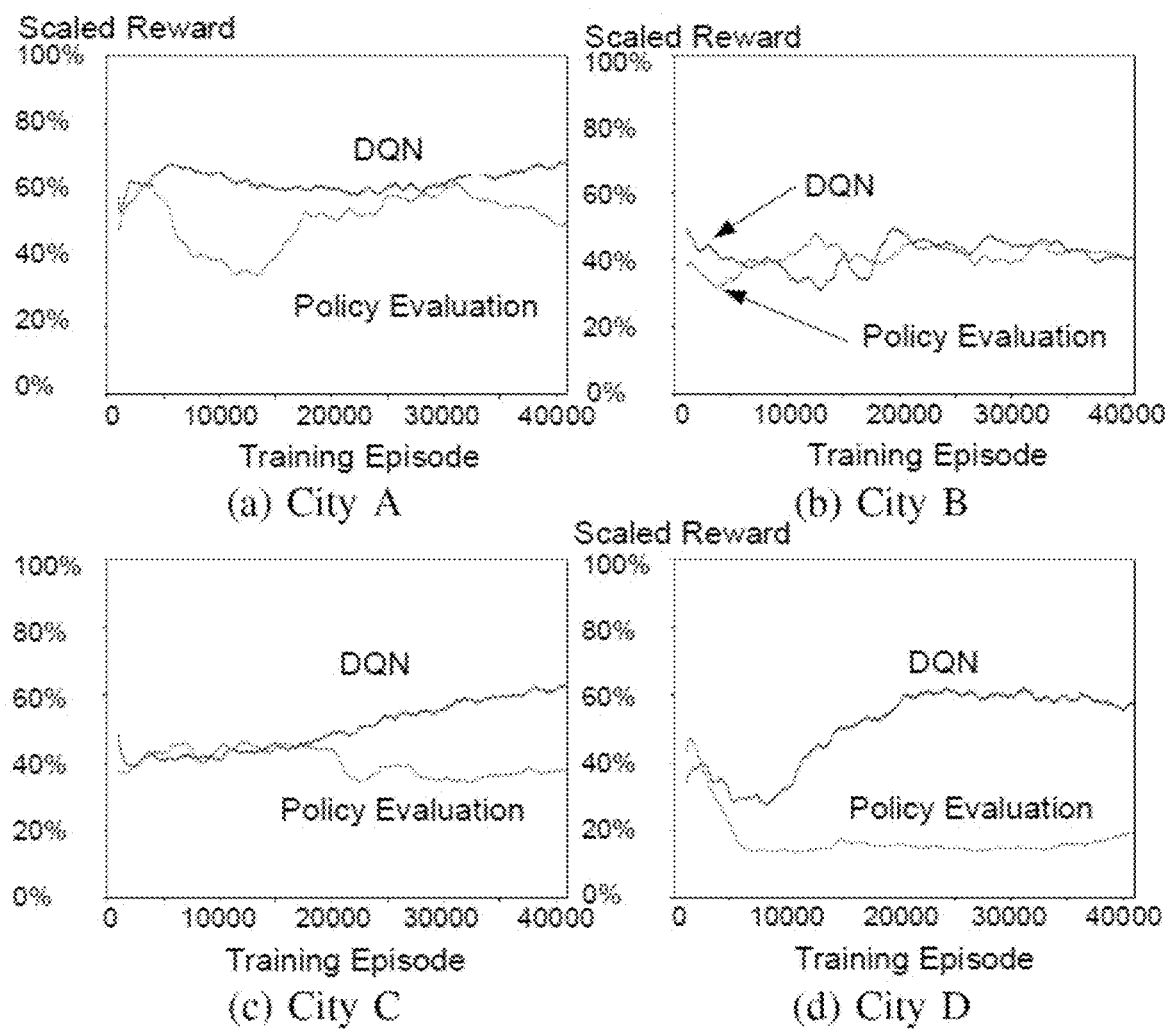
FIG. 3J illustrates training curves of DQN with action search on the four cities, in accordance with various embodiments.
Figure 3K:
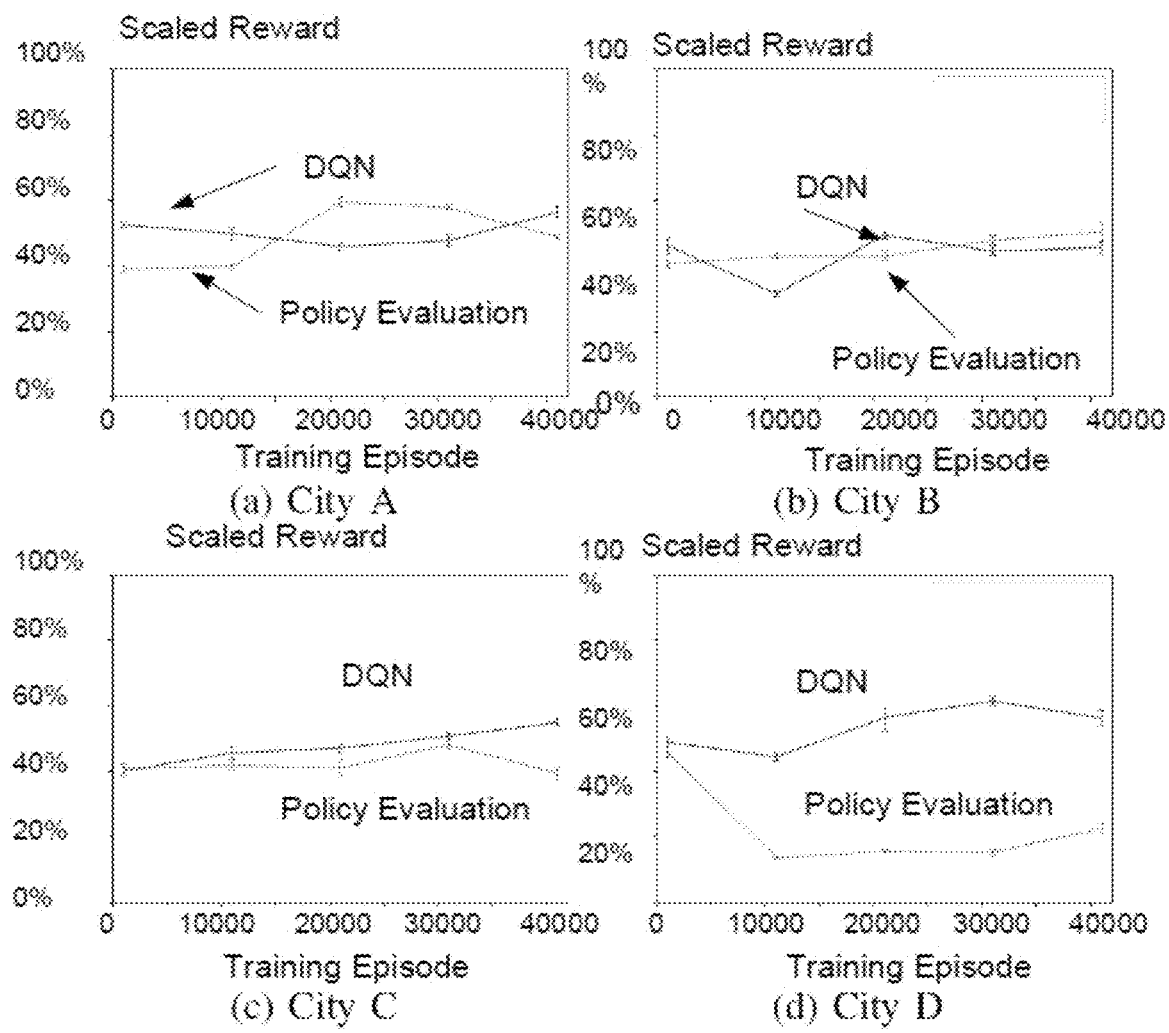
FIG. 3K illustrates testing evaluation of DON with action search on four cities at five different checkpoints on the training phase, in accordance with various embodiments.

FIG. 3J shows the training curves of DQN and policy evaluation, where the former is maximizing the accumulative rewards and the latter is learning to evaluate the current policy that generates the historical data as described above for the single-agent evaluation environment. The testing curves with standard deviation error bars are shown in FIG. 3K. The "historical average" represents the average revenue of randomly sampled transitions from the testing data set, which indicates the performance of the real dispatching system.

As seen from the illustrated performance curves, the disclosed Algorithm 2 is capable of learning to optimize the episode order revenue. FIG. 3H shows he average Q values of training minibatches, where the convergence of the value functions in all cases are observed. As discussed above, the state values of 120 randomly sampled location cells are plotted by time id in FIG. 3I: each point indicates the potential future rewards discounted with $\gamma=0.9$, so the state value is computed within a decaying future horizon. The state value function correctly captures the decreasing monotonicity in the temporal space of the discounted cumulative rewards. However, the learning results, or improvements are not the same among different cities. In the disclosed experiments, for those smaller cities with less trips data (due to fewer users in such areas), e.g., B in FIG. 3J(b), the optimization improvement is not as significant as larger cities such as C or D, when the DQN and the policy evaluation are compared. This is because in such cities with lighter order demand, the trip patterns are much simpler, and the current order dispatching system may nearly achieve the optimal match between the drivers and the customers, which means there is not much optimization margin available for the policy improvement. However, in those cities with heavier dispatching load and lager trip data amount, the optimization improvement is more obvious, like City D in FIG. 3J(d).

In some embodiments with respect to transfer improvement evaluation, to achieve robust and effective network training on the target cities, two types of transfer experiments are performed: spatial transfer and temporal transfer. For spatial transfer, among the four experiment cities mentioned above, City A is used as the source city, while the other three are used as the target cities. For temporal transfer, the city models trained on one month's data are used as the source, while the models of the same cities trained on another month's data are used as the target. The trained network weights from the previous baseline DQN training are used as the prior knowledge. Under each type of transfer experiments, the learning performance of the three transfer methods: fine-tuning, progressive network and correlated-feature progressive transfer (CFPT) are discussed.

Figure 3L:
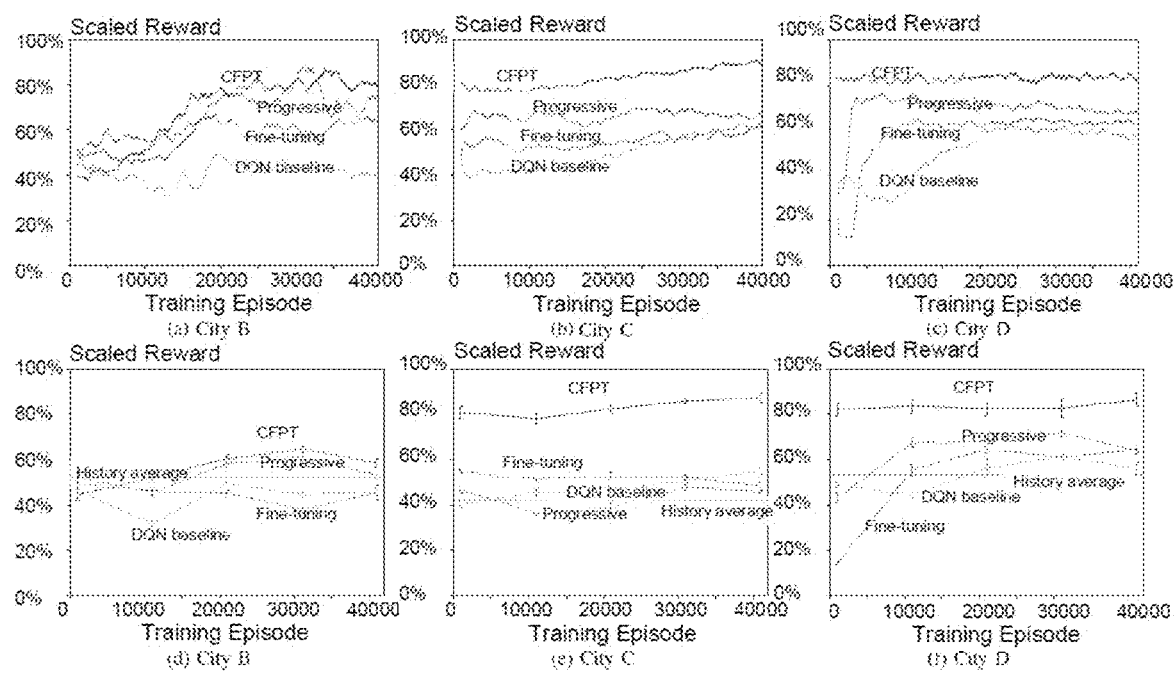
FIG. 3L illustrates training and testing curves of the spatial transfer, in accordance with various embodiments.
Figure 3M:
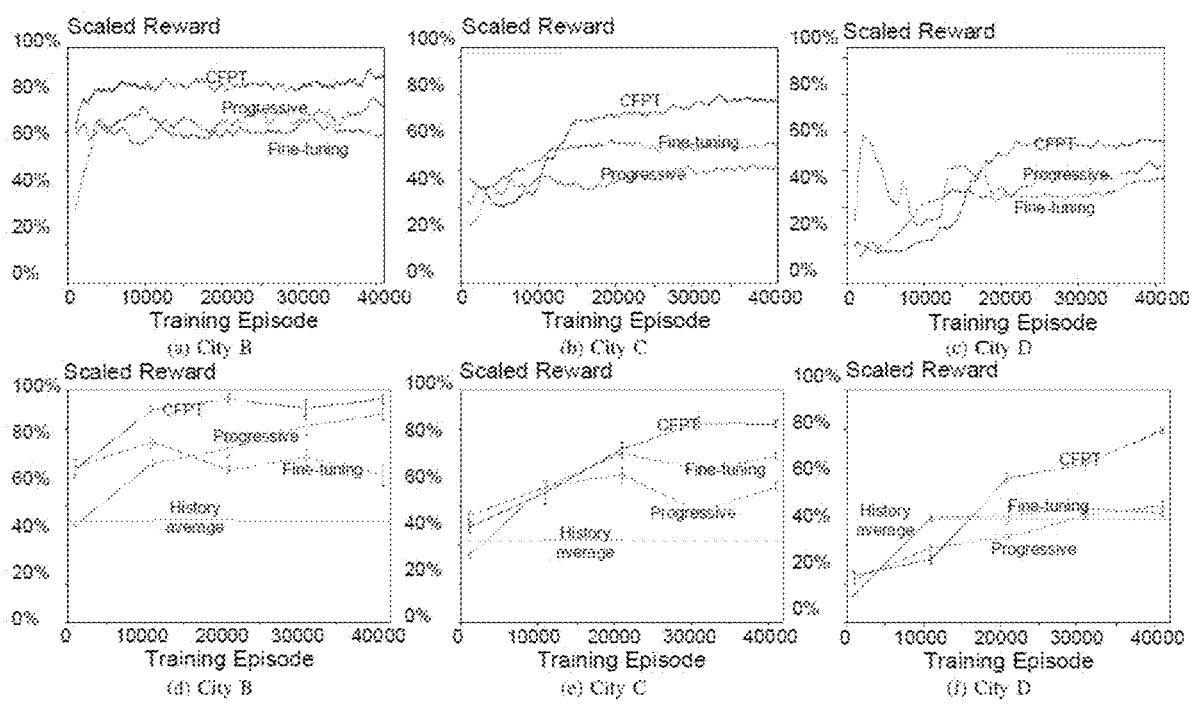
FIG. 3M illustrates training and testing curves of the temporal transfer, in accordance with various embodiments.

Training curves and testing checkpoints are shown in FIG. 3L. To highlight the results, the average of the accumulated episode reward sampled from the historical trip data in the real dispatching system are highlighted. Compared to the vanilla DQN training, the improvements of the disclosed method include: 1) target cities will benefit from jumpstart, which is the increased initial performance at the start; 2) learning is more efficient, which means the convergence would happen earlier during training; 3) the converged performance is better. However, the effectiveness of the three methods are different. In particular, CFPT would outperform the other two transfer methods, indicating that the online features f would be more helpful for the learning adaption across different cities if used separately from the absolute spatio-temporal states (l, t). The disadvantage of the original progressive network is that it does not consider the correlation difference among all state/feature elements. Because of the catastrophic forgetting property of fine-tuning, the prior knowledge will easily be forgotten along with the update of weights, and less significant improvement on the converged performance is observed. Temporal transfer results are shown in FIG. 3M. Even if the transfer is performed within the same city, CFPT significantly outperforms the baseline fine-tuning method, which directly copies the network from a previous month and continue training.

Figure 3N:
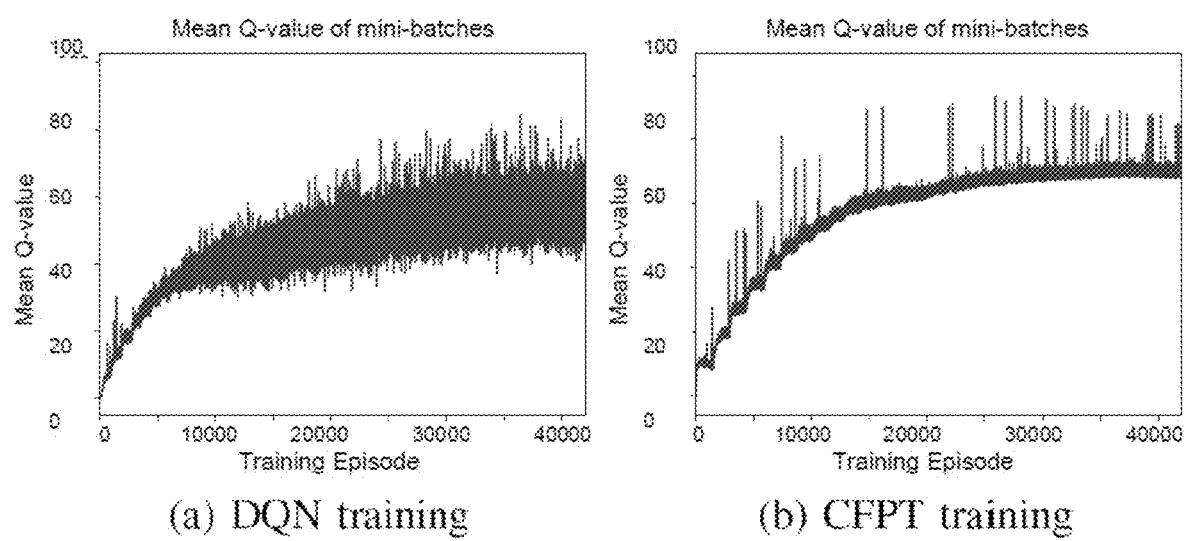
FIG. 3N illustrates a comparison between DQN training and CFPT training of the average mini-batch Q values for City D, in accordance with various embodiments.

To get insight into how the knowledge transfer could help improve the training in the target cities, the average Q values in each batch during training are compared. Taking City D as an example, the distinct difference between the Q-value curves is shown in FIG. 3N. For the original DQN training, there's still noticeable variance even though the mean Q value is almost converged. In contrast, for CFPT, the batch's variance is much smaller. Such difference could indicate that through the lateral connection from the previous trained network, the direction of "gradient decent" in the target training is more explicit. In other words, transferring the prior knowledge may efficiently guide the learning direction.

Compared to the vanilla DQN training, the disclosed systems and methods with respect to CFPT are more advantageous at least in terms of: 1) target cities will benefit from jumpstart, which is the increased initial performance at the start, 2) learning is more efficient, which means the convergence would happen earlier during training, and 3) the convergence performance is better. However, the effectiveness of the three methods are different. For example, CFPT outperforms the other two transfer methods (fine-tuning method and progressive network method), indicating that the online feature f is more helpful for the learning adaption across different cities if used separately from the absolute spatio-temporal states (l, t). Compared to the original DQN training, the training batch's variance in CFPT is much smaller. Such difference may indicate that through the lateral connection from the previous trained network, the direction of "gradient decent" in the target training is more explicit. In other words, transferring the prior knowledge can efficiently guide the learning direction. As discussed, due to the problem diversity across different cities, the vehicle platform needs to optimize massive policy models. Considering the computation cost, transfer learning is used to help increase the learning adaptability and efficiency. By reusing the trained network from a source city as prior knowledge, there is significant improvement on the performance for multiple target cities, compared with no-prior-learning. Transferring correlated prior knowledge (e.g., from the source city) provides an efficient solution to boost the learning process for RL and help improve the training performance in the target cities.

As described, an adapted DQN-based optimization method may be used by a vehicle dispatching platform to determine order dispatching. Different from the vanilla DQN with enumerable output actions, the continuous action space (trip destination) may be encoded as part of the input state space, and a corresponding action search method is disclosed. The disclosed methods are capable of optimizing the spatio-temporal problem from a single driver's point of view or from multiple drivers' points of view. Due to the diverse learning results caused by the variety of cities' traffic patterns, the learning process is not trivial across different cities. As a solution to combating such diversity, an online-feature based adaption method CFPT is described. Results prove that reusing trained models can speed up the learning and improve the robustness when dealing with new patterns. In particular, by focusing on the correlated features across different domains, CFPT achieves the most effective transfer and outperforms other existing methods.

FIG. 4A illustrates a flowchart of an exemplary method 400, according to various embodiments of the present disclosure. The method 400 may be implemented in various environments including, for example, the system 100 of FIG. 1. The exemplary method 400 may be implemented by one or more components of the system 102 (e.g., the processor 104, the memory 106) or the computing device 111 (e.g., a mobile phone associated with a vehicle driver). For example, a non-transitory computer-readable storage medium may store instructions that, when executed by a processor, cause the processor to perform the method 400 (also referred to as a ride order dispatching method). The exemplary method 400 may be implemented by multiple systems similar to the system 102. The operations of method 400 presented below are intended to be illustrative. Depending on the implementation, the exemplary method 400 may include additional, fewer, or alternative steps performed in various orders or in parallel.

At block 402, information on a location of a vehicle and a time (e.g., a time when the vehicle starts to look for ride orders or after fulfilling a ride order) may be input to a trained second neural network algorithm. At block 404, based on a policy generated from the trained second neural network algorithm, action information for the vehicle may be obtained. For example, the action information may comprise: staying at a current position of the vehicle (e.g., when a ride order is likely to be received at the current location soon), re-positioning the vehicle (e.g., to another place that a ride order or a more rewarding ride order is more likely), or accepting a ride order (e.g., when one or more rider orders are currently available). The second neural network algorithm is trained with one or more first network weights and with second ride order dispatching data associated with a second region in a second training to obtain one or more second network weights. The one or more first network weights are obtained from training a first neural network algorithm with first ride order dispatching data associated with a first region in a first training. The second neural network algorithm comprises an input layer, a first sequence of hidden layers, a second sequence of hidden layers, and an output layer. Each of the hidden layers in the first sequence has an output correspondingly coupled to one of the hidden layers in the second sequence and the output layer. For the input layer, the second ride order dispatching data comprises (1) one or more second state inputs for inputting into the second sequence of hidden layers and (2) one or more first state inputs for inputting into the first sequence of hidden layers.

In some embodiments, the second neural network algorithm comprises a deep neural network and reinforcement learning algorithm. The second neural network algorithm comprises one or more action inputs, one or more state inputs, and a state-action value output. The first neural network algorithm may be similar to the second neural network algorithm, except that the first neural network algorithm may not have the progressive network. That is, the first neural network algorithm may not have transfer learning. The first neural network algorithm may be trained with the deep-Q network with or without action search described herein or another alternative method.

FIG. 4B illustrates a flowchart of an exemplary method 450, according to various embodiments of the present disclosure. The method 450 may be implemented in various environments including, for example, the system 100 of FIG. 1. The exemplary method 450 may be implemented by one or more components of the system 102 (e.g., the processor 104, the memory 106). For example, a non-transitory computer-readable storage medium may store instructions that, when executed by a processor, cause the processor to perform the method 450 (also referred to as a ride order dispatching method). The exemplary method 450 may be implemented by multiple systems similar to the system 102. The operations of method 450 presented below are intended to be illustrative. Depending on the implementation, the exemplary method 450 may include additional, fewer, or alternative steps performed in various orders or in parallel. Various modules described below may have been trained, e.g., by the methods discussed above.

At block 452, information on a location of a vehicle and a time to input to a trained second neural network algorithm may be obtained. At block 454, based on a policy generated from the trained second neural network algorithm, action information for the vehicle may be obtained, the action information comprising: staying at a current position of the vehicle, re-positioning the vehicle, or accepting a ride order. At block 456, the action information may be caused to be played on a device associated with a driver of the vehicle (e.g., displayed on a screen of a mobile phone, played as a voice).

The techniques described herein are implemented by one or more special-purpose computing devices. The special-purpose computing devices may be hard-wired to perform the techniques, or may include circuitry or digital electronic devices such as one or more application-specific integrated circuits (ASICs) or field programmable gate arrays (FPGAs) that are persistently programmed to perform the techniques, or may include one or more hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, server computer systems, portable computer systems, handheld devices, networking devices or any other device or combination of devices that incorporate hard-wired and/or program logic to implement the techniques. Computing device(s) are generally controlled and coordinated by operating system software. Conventional operating systems control and schedule computer processes for execution, perform memory management, provide file system, networking, I/O services, and provide a user interface functionality, such as a graphical user interface ("GUI"), among other things.

Figure 5:
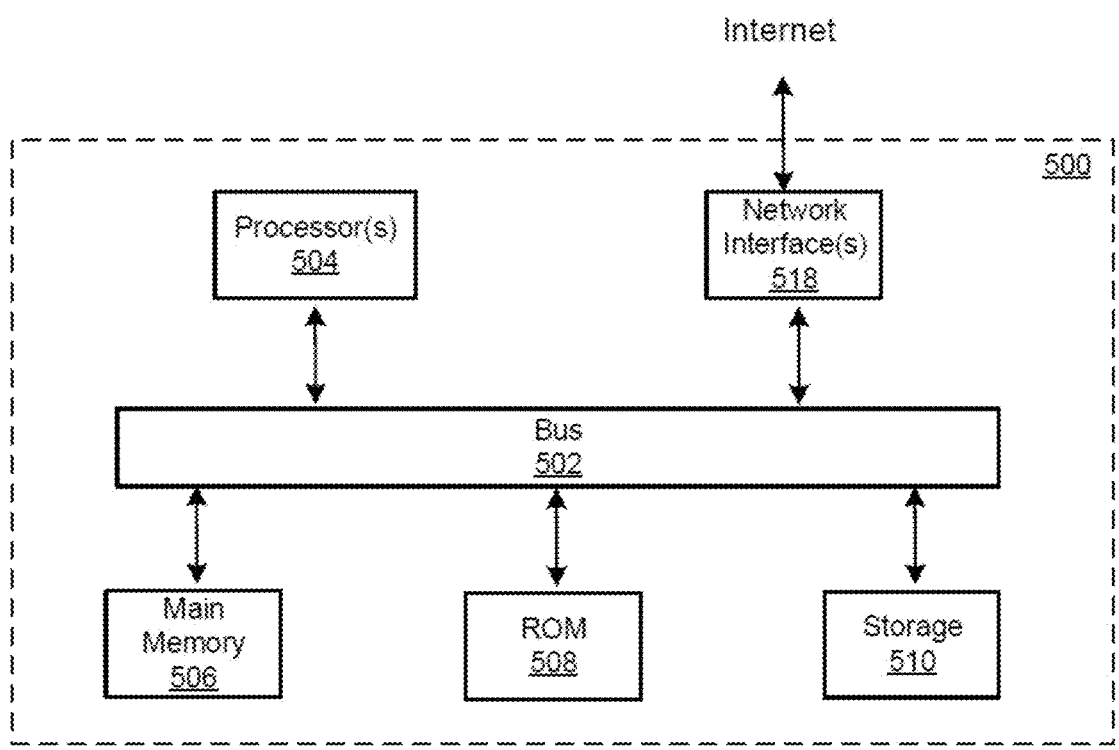
FIG. 5 illustrates a block diagram of an exemplary computer system in which any of the embodiments described herein may be implemented.

FIG. 5 is a block diagram that illustrates a computer system 500 upon which any of the embodiments described herein may be implemented. The system 500 may correspond to the system 102 described above. The computer system 500 includes a bus 502 or other communication mechanism for communicating information, one or more hardware processors 504 coupled with bus 502 for processing information. Hardware processor(s) 504 may be, for example, one or more general purpose microprocessors. The processor(s) 504 may correspond to the processor 104 described above.

The computer system 500 also includes a main memory 506, such as a random access memory (RAM), cache and/or other dynamic storage devices, coupled to bus 502 for storing information and instructions to be executed by processor 504. Main memory 506 also may be used for storing temporary variables or other intermediate information during execution of instructions to be executed by processor 504. Such instructions, when stored in storage media accessible to processor 504, render computer system 500 into a special-purpose machine that is customized to perform the operations specified in the instructions. The computer system 500 further includes a read only memory (ROM) 508 or other static storage device coupled to bus 502 for storing static information and instructions for processor 504. A storage device 510, such as a magnetic disk, optical disk, or USB thumb drive (Flash drive), etc., is provided and coupled to bus 502 for storing information and instructions. The main memory 506, the ROM 508, and/or the storage 510 may correspond to the memory 106 described above.

The computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor(s) 504 executing one or more sequences of one or more instructions contained in main memory 506. Such instructions may be read into main memory 506 from another storage medium, such as storage device 510. Execution of the sequences of instructions contained in main memory 506 causes processor(s) 504 to perform the process steps described herein. In alternative embodiments, hard-wired circuitry may be used in place of or in combination with software instructions.

The main memory 506, the ROM 508, and/or the storage 510 may include non-transitory storage media. The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 510. Volatile media includes dynamic memory, such as main memory 506. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

The computer system 500 also includes a communication interface 518 coupled to bus 502. Communication interface 518 provides a two-way data communication coupling to one or more network links that are connected to one or more local networks. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN (or WAN component to communicated with a WAN). Wireless links may also be implemented. In any such implementation, communication interface 518 sends and receives electrical, electromagnetic or optical signals that carry digital data streams representing various types of information.

The computer system 500 can send messages and receive data, including program code, through the network(s), network link and communication interface 518. In the Internet example, a server might transmit a requested code for an application program through the Internet, the ISP, the local network and the communication interface 518.

The received code may be executed by processor 504 as it is received, and/or stored in storage device 510, or other non-volatile storage for later execution.

Each of the processes, methods, and algorithms described in the preceding sections may be embodied in, and fully or partially automated by, code modules executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The exemplary systems and components described herein may be configured differently than described. For example, elements may be added to, removed from, or rearranged compared to the disclosed example embodiments.

The various operations of exemplary methods described herein may be performed, at least partially, by an algorithm. The algorithm may be comprised in program codes or instructions stored in a memory (e.g., a non-transitory computer-readable storage medium described above). Such algorithm may comprise a machine learning algorithm. In some embodiments, a machine learning algorithm may not explicitly program computers to perform a function, but can learn from training data to make a predictions model that performs the function.

The various operations of exemplary methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Any process descriptions, elements, or blocks in the flow diagrams described herein and/or depicted in the attached figures should be understood as potentially representing modules, segments, or portions of code which include one or more executable instructions for implementing specific logical functions or steps in the process. Alternate implementations are included within the scope of the embodiments described herein in which elements or functions may be deleted, executed out of order from that shown or discussed, including substantially concurrently or in reverse order, depending on the functionality involved, as would be understood by those skilled in the art.

As used herein, the term "or" may be construed in either an inclusive or exclusive sense. Moreover, plural instances may be provided for resources, operations, or structures described herein as a single instance. Additionally, boundaries between various resources, operations, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

What is claimed is:

1. A method for ride order dispatching, comprising:
   obtaining information on a location of a vehicle and a time to input into a trained second neural network algorithm; and
   based on a policy generated from the trained second neural network algorithm, obtaining action information for the vehicle, the action information comprising: staying at a current position of the vehicle, re-positioning the vehicle, or accepting a ride order, wherein:
   the second neural network algorithm is trained with one or more first network weights and with second ride order dispatching data associated with a second region in a second training to obtain one or more second network weights;
   the one or more first network weights are obtained from training a first neural network algorithm with first ride order dispatching data associated with a first region in a first training;
   the second neural network algorithm comprises an input layer, a first sequence of hidden layers, a second sequence of hidden layers, and an output layer;
   each of the hidden layers in the first sequence has an output correspondingly coupled to one of the hidden layers in the second sequence and the output layer; and
   for the input layer, the second ride order dispatching data comprises (1) one or more second state inputs for inputting into the second sequence of hidden layers and (2) one or more first state inputs for inputting into the first sequence of hidden layers.

2. The method of claim 1, wherein:
   the first neural network algorithm has a same network structure as the second neural network algorithm;
   the first neural network algorithm comprises another input layer, a third sequence of hidden layers, a fourth sequence of hidden layers, and another output layer;
   each of the hidden layers in the third sequence has another output correspondingly coupled to one of the hidden layers in the fourth sequence and the another output layer;
   for the another input layer, the first ride order dispatching data comprises (1) one or more third state inputs for inputting into the third sequence of hidden layers and (2) one or more fourth state inputs for inputting into the fourth sequence of hidden layers;
   before the first training, the one or more first network weights are trainable weights between neighboring layers among the another input layer, the third sequence of layers, and the another output layer; and
   after the first training, the trained one or more first network weights are correspondingly transferred to the first sequence for the second training.

3. The method of claim 1, wherein:
   the second state inputs comprise state inputs that are locality-dependent; and
   the first state inputs comprise state inputs that are locality-independent.

4. The method of claim 1, wherein:
   the second state inputs comprise a spatio-temporal vector; and
   the first state inputs comprise a spatio-temporal displacement vector and one or more real-time contextual features.

5. The method of claim 4, wherein the spatio-temporal displacement vector comprises a change in geo-coordinates of a simulated vehicle and a change in time.

6. The method of claim 4, wherein the real-time contextual features comprise at least one of:
   a real-time number of idle drivers; or
   a real-time number of orders created in a past time period.

7. The method of claim 1, wherein:
   the second sequence of hidden layers comprise layers $B_x$, X being 1, 2, ... N;
   the input layer is coupled to the layer $B_1$;
   the layer $B_N$'s output is coupled to the output layer;
   the layer $B_x$'s output is coupled to the layer $B_{x+1}$ as an input, except for the layer the layer $B_N$;
   the first sequence of hidden layers comprise layers $A_x$;
   the input layer is coupled to the layer $A_1$;
   the layer $A_N$'s output is coupled to the output layer;
   the layer $A_x$'s output is coupled to the layer $A_{x+1}$ as an input, except for the layer the layer $A_N$;
   the layer $A_x$'s output is coupled to the layer $B_{x+1}$ as an input, except for the layer the layer $A_N$;
   the couplings between the input layer and the layer $B_1$, between neighboring layers in the second sequence, and between layer $B_N$ and the output layers are associated with the second network weights; and
   the couplings between the input layer and the layer $A_1$, between neighboring layers in the first sequence, and between layer $A_N$ and the output layers are associated with the first network weights.

8. The method of claim 7, wherein:
layer $B_x$ is obtained based on layer $A_{x-1}$ and layer $B_{x-1}$; and
the output layer is obtained based on layer $A_N$ and layer $B_N$.

9. The method of claim 1, wherein:
the policy maximizes a cumulative reward for a driver of he vehicle.

10. A system for ride order dispatching, comprising a processor and a non-transitory computer-readable storage medium storing instructions that, when executed by the processor, cause the system to perform a method, the method comprising:
obtaining information on a location of a vehicle and a time to input into a trained second neural network algorithm; and
based on a policy generated from the trained second neural network algorithm, obtaining action information for the vehicle, the action information comprising: staying at a current position of the vehicle, re-positioning the vehicle, or accepting a ride order, wherein:
the second neural network algorithm is trained with one or more first network weights and with second ride order dispatching data associated with a second region in a second training to obtain one or more second network weights;
the one or more first network weights are obtained from training a first neural network algorithm with first ride order dispatching data associated with a first region in a first training;
the second neural network algorithm comprises an input layer, a first sequence of hidden layers, a second sequence of hidden layers, and an output layer;
each of the hidden layers in the first sequence has an output correspondingly coupled to one of the hidden layers in the second sequence and the output layer; and
for the input layer, the second ride order dispatching data comprises (1) one or more second state inputs for inputting into the second sequence of hidden layers and (2) one or more first state inputs for inputting into the first sequence of hidden layers.

11. The system of claim 10, wherein:
the first neural network algorithm has a same network structure as the second neural network algorithm;
the first neural network algorithm comprises another input layer, a third sequence of hidden layers, a fourth sequence of hidden layers, and another output layer;
each of the hidden layers in the third sequence has another output correspondingly coupled to one of the hidden layers in the fourth sequence and the another output layer;
for the another input layer, the first ride order dispatching data comprises (1) one or more third state inputs for inputting into the third sequence of hidden layers and (2) one or more fourth state inputs for inputting into the fourth sequence of hidden layers;
before the first training, the one or more first network weights are trainable weights between neighboring layers among the another input layer, the third sequence of layers, and the another output layer; and
after the first training, the trained one or more first network weights are correspondingly transferred to the first sequence for the second training.

12. The system of claim 10, wherein:
the second state inputs comprise state inputs that are locality-dependent; and
the first state inputs comprise state inputs that are locality-independent.

13. The system of claim 10, wherein:
the second state inputs comprise a spatio-temporal vector; and
the first state inputs comprise a spatio-temporal displacement vector and one or more real-time contextual features.

14. The system of claim 13, wherein the spatio-temporal displacement vector comprises a change in geo-coordinates of a simulated vehicle and a change in time.

15. The system of claim 13, wherein the real-time contextual features comprise at least one of:
a real-time number of idle drivers; or
a real-time number of orders created in a past time period.

16. The system of claim 10, wherein:
the second sequence of hidden layers comprise layers $B_x$, X being 1, 2, ... N;
the input layer is coupled to the layer $B_1$;
the layer $B_N$'s output is coupled to the output layer;
the layer $B_x$'s output is coupled to the layer $B_{x+1}$ as an input, except for the layer the layer $B_N$;
the first sequence of hidden layers comprise layers $A_x$;
the input layer is coupled to the layer $A_1$;
the layer $A_N$'s output is coupled to the output layer;
the layer $A_x$'s output is coupled to the layer $A_{x+1}$ as an input, except for the layer the layer $A_N$;
the layer $A_x$'s output is coupled to the layer $B_{x+1}$ as an input, except for the layer the layer $A_N$;
the couplings between the input layer and the layer $B_1$, between neighboring layers in the second sequence, and between layer $B_N$ and the output layers are associated with the second network weights; and
the couplings between the input layer and the layer $A_1$, between neighboring layers in the first sequence, and between layer $A_N$ and the output layers are associated with the first network weights.

17. The system of claim 16, wherein:
layer $B_x$ is obtained based on layer $A_{x-1}$ and layer $B_{x-1}$; and
the output layer is obtained based on layer $A_N$ and layer $B_N$.

18. The system of claim 10, wherein:
the policy maximizes a cumulative reward for a driver of the vehicle.

19. A non-transitory computer-readable storage medium storing instructions that, when executed by a processor, cause the processor to perform a ride order dispatching method, the method comprising:
obtaining information on a location of a vehicle and a time to input to a trained second neural network algorithm;
based on a policy generated from the trained second neural network algorithm, obtaining action information for the vehicle, the action information comprising: staying at a current position of the vehicle, re-positioning the vehicle, or accepting a ride order; and
causing the action information to be played on a device associated with a driver of the vehicle, wherein:
the second neural network algorithm is trained with one or more first network weights and with second ride order dispatching data associated with a second region in a second training to obtain one or more second network weights;
the one or more first network weights are obtained from training a first neural network algorithm with first ride order dispatching data associated with a first region in a first training;

the second neural network algorithm comprises an input layer, a first sequence of hidden layers, a second sequence of hidden layers, and an output layer;

each of the hidden layers in the first sequence has an output correspondingly coupled to one of the hidden layers in the second sequence and the output layer; and for the input layer, the second ride order dispatching data comprises (1) one or more second state inputs for inputting into the second sequence of hidden layers and (2) one or more first state inputs for inputting into the first sequence of hidden layers.

20. The non-transitory computer-readable storage medium of claim 19, wherein:

the first neural network algorithm has a same network structure as the second neural network algorithm;

the first neural network algorithm comprises another input layer, a third sequence of hidden layers, a fourth sequence of hidden layers, and another output layer;

each of the hidden layers in the third sequence has another output correspondingly coupled to one of the hidden layers in the fourth sequence and the another output layer;

for the another input layer, the first ride order dispatching data comprises (1) one or more third state inputs for inputting into the third sequence of hidden layers and (2) one or more fourth state inputs for inputting into the fourth sequence of hidden layers;

before the first training, the one or more first network weights are trainable weights between neighboring layers among the another input layer, the third sequence of layers, and the another output layer; and after the first training, the trained one or more first network weights are correspondingly transferred to the first sequence for the second training.

* * * * *